United States Patent [19]

Umeno et al.

[11] Patent Number: 5,109,489

[45] Date of Patent: * Apr. 28, 1992

[54] I/O EXECUTION METHOD FOR A VIRTUAL MACHINE SYSTEM AND SYSTEM THEREFOR

[75] Inventors: Hidenori Umeno, Kanagawa; Takashige Kubo, Hachioji; Nobutaka Hagiwara, Fujisawa; Hiroaki Sato; Hideo Sawamoto, both of Hadano, all of Japan

[73] Assignee: Hitachi, Ltd., Tokyo, Japan

[*] Notice: The portion of the term of this patent subsequent to Dec. 5, 2006 has been disclaimed.

[21] Appl. No.: 369,535

[22] Filed: Jun. 21, 1989

Related U.S. Application Data

[63] Continuation of Ser. No. 691,909, Jan. 16, 1985, Pat. No. 4,885,681.

[30] Foreign Application Priority Data

Jan. 18, 1984 [JP] Japan .................................. 5587/84

[51] Int. Cl.⁵ .............................................. G06F 1/00
[52] U.S. Cl. ................................. 395/275; 361/228.2; 361/230.2; 361/280; 361/280.8
[58] Field of Search .................... 364/200MS, 900MS

[56] References Cited

U.S. PATENT DOCUMENTS

| | | | |
|---|---|---|---|
| 4,253,145 | 2/1981 | Goldberg | 364/200 |
| 4,285,040 | 2/1981 | Carlson et al. | 364/200 |
| 4,400,769 | 8/1983 | Kaneda et al. | 364/200 |
| 4,456,954 | 6/1984 | Bullions, III et al. | 364/200 |
| 4,459,661 | 7/1984 | Kaneda et al. | 364/200 |
| 4,494,189 | 1/1985 | Bean et al. | 364/200 |
| 4,533,996 | 8/1985 | Hartung et al. | 364/200 |

FOREIGN PATENT DOCUMENTS 53-142137 12/1978 Japan.

OTHER PUBLICATIONS

370-XA Principles of Operation, IBM SA22-7085-O, pp. 13-1 to 13-9, 1983.
Virtual Machine/Extended Architecture Migration Aid General Information Manual, IBM GC19-6R13-O, pp. 1-31, Copyright 1982.

*Primary Examiner*—Terrell W. Fears
*Assistant Examiner*—Rebecca L. Rudolph
*Attorney, Agent, or Firm*—Antonelli, Terry, Stout & Kraus

[57] ABSTRACT

In a virtual machine system (VMS) capable of concurrently running at least one operating system (OS) under one real computer system and a control program (VMCP) for controlling the VMS, the object is to reduce the overhead produced for simulating VM I/Os by direct I/O execution. A VM information area of a real sub-channel control block has a status field in which a flag indicating that the sub-channel is dedicated or not is contained. When the flag is "1", it means that the sub-channel is dedicated to the VM and the sub-channel scheduling by the VMCP is not necessary. As a real interruption priority order is dedicated to a VM, only I/O interruption requests of the VM are queued into the real interruption request queue of that dedicated priority order, and the mixing of VMs in that real interruption priority order is avoided. When an interruption control mask of an interruption priority order of the OS on the VM is "0" indicating that the interruption is not acceptable by the VM, the interruption conrol mask of the corresponding dedicated real interruption priority order is also "0" and the hardware interruption does not take place. Accordingly, the interruption is retained by the hardware and the I/O interruption retention for the VM by the VMCP is avoided.

55 Claims, 18 Drawing Sheets

FIG. 3
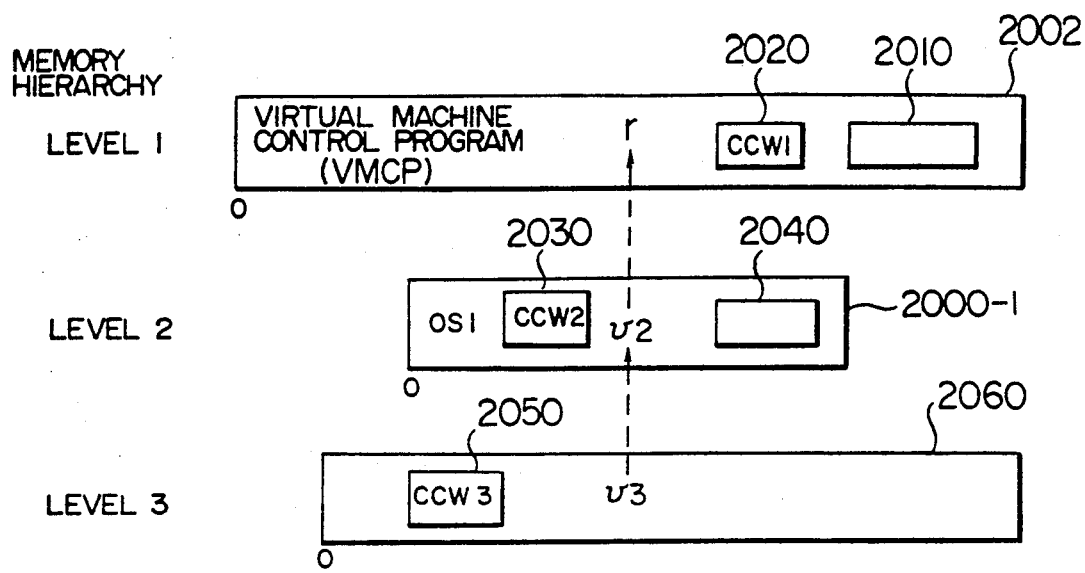
FIG. 4a   FIG. 4b
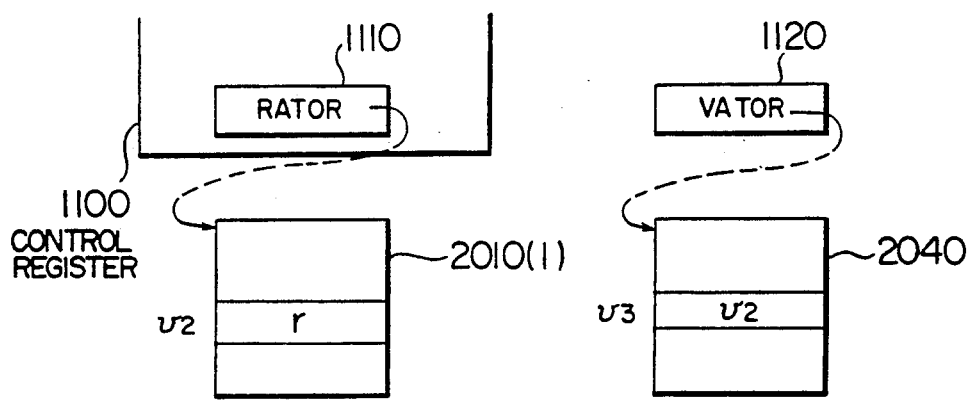
FIG. 4c
| | | | | 3030 |
|---|---|---|---|---|
| | | | | |
| VM # | VATOR | 1 | $v3$ | r |
| VM # | RATOR | 0 | $v2$ | r |
| FIELD 1 | FIELD 2 | FIELD 3 | FIELD 4 | FIELD 5 |

FIG. 10
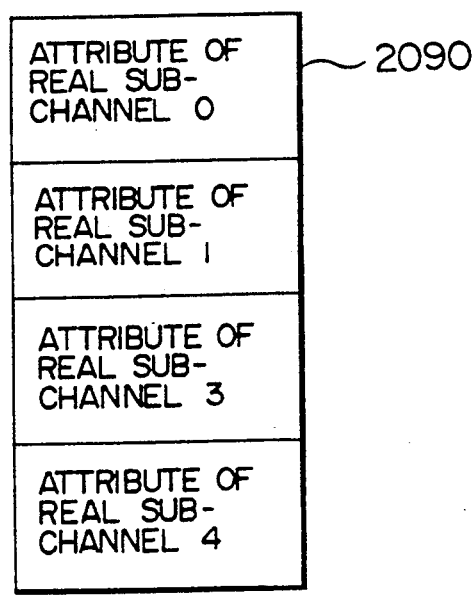
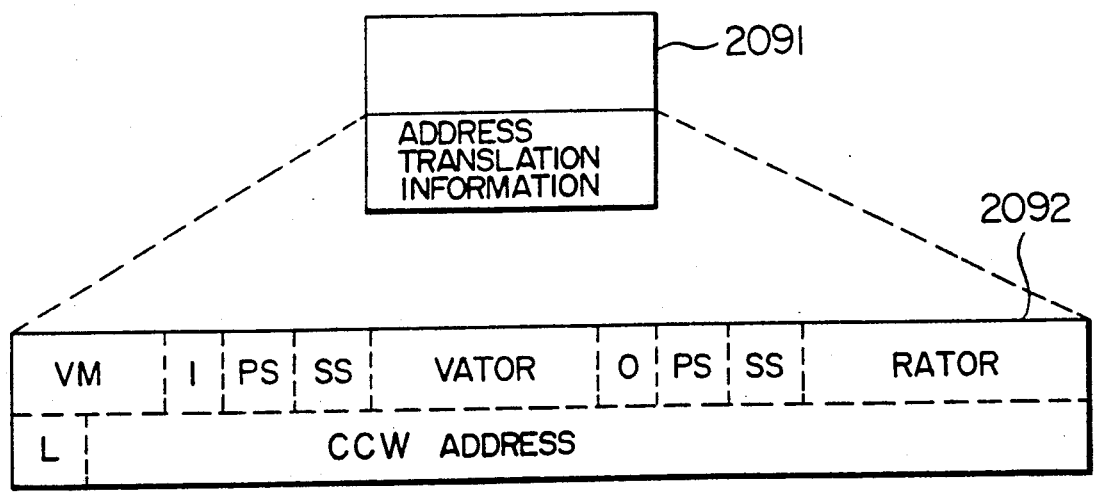

| VM | VIRTUAL INTERRUPTION PRIORITY ORDER | DEDICATION/SHARE | REAL INTERRUPTION PRIORITY ORDER | REMARK |
|---|---|---|---|---|
| 0 | 0 | DEDICATED | 0 | DEDICATED TO VMCP |
| 1 | 0 | DEDICATED | 1 | |
| | 1~7 | SHARE | 31 | |
| 2 | 0 | DEDICATED | 2 | |
| | 1 | DEDICATED | 3 | |
| | 2~7 | SHARE | 31 | |
| 3 | 0 | DEDICATED | 4 | |
| | 1 | DEDICATED | 5 | |
| | 2~3 | SHARE | 30 | PRIORITY ORDER AMONG SHARED UNITS |
| | 4~7 | SHARE | 31 | |

I/O EXECUTION METHOD FOR A VIRTUAL MACHINE SYSTEM AND SYSTEM THEREFOR

This application is a continuation of application Ser. No. 691,909, filed Jan. 16, 1985, now U.S. Pat. No. 4,885,681, issued Dec. 5, 1989.

BACKGROUND OF THE INVENTION

The present invention relates to a high speed virtual machine system (VMS), and more particularly to method and system for reducing an I/O simulation overhead of the VMS.

The specifications of the Japanese Patent Application Kokai No. 55-76950 laid open on Jun. 24, 1975, No. 56-19153 laid open on Feb. 23, 1981 and No. 55-42326 laid open on Mar. 25, 1980 and the U.S. Pat. No. 4,459,661 (Saburo Kaneda et al., Apr. 21, 1982), which was filed with the Convention priority based on the latter Japanese Patent Application Kokai, disclose virtual machine systems.

FIG. 1 shows the configuration of a real computer system 9000. Numeral 1000 denotes a central processing unit (CPU), numeral 2000 denotes a main memory, numeral 3000 denotes an I/O processor (IOP), and numeral 4000 denotes an I/O controller (IOC). Numeral 100 denotes a signal line between the CPU 1000 and the main memory 2000, numeral 200 denotes a signal line between the CPU 1000 and the IOP 3000, numeral 300 denotes a signal line between the IOP 3000 and the main memory 2000, and numeral 400 denotes a signal line between the IOP 3000 and the IOC 4000. The real computer system 9000 is operated under a control of a resource management (CPU, main memory and I/O devices) of an overall system of an operating system (OS) on the main memory 2000.

The configuration of a virtual machine system (VMS) is shown in FIG. 2. A real computer system 10000 has a similar hardware configuration (CPU, main memory and I/O devices) as that shown in FIG. 1 but it has a VMS control program (VMCP or simply CP) on the main memory 2000. A plurality of logical machines (called virtual machines (VM)) are logically configured by a hardware simulation function of the VMCP. The VM's 10000-1 (VM1), 10000-2 (VM2) and 10000-3 (VM3) each is logically configured to have the same hardware configuration as the real computer system (called a host system) 10000. The OS-N (N=1, 2, 3) which controls the VM exists on each main memory 2000-N (N=1, 2, 3) of each VM, and those OS's run concurrently under one host system. The hardware configuration (CPU, main memory, IOP and IOC) in each VM of FIG. 2 is logically configured by the VMCP and most portions of the substance thereof exist on the corresponding hardware configuration in each virtual machine configured by the host system. For example, as its main memory, the VM may exclusively occupy a portion of the main memory 2000 of the host system or may share the main memory 2000, and as its I/O devices, the VM may share the I/O devices of the host system or may exclusively occupy the I/O device. Alternatively, there may be no corresponding I/O device on the host system and the I/O device may be virtually configured by simulation by the VMCP. In any case, the OS on the main memory 2000-N (N=1, 2, 3) on each VM can see the same hardware configuration (CPU, main memory, IOP and IOC) as that of the host system. It should be noted that the architecture (hardware configuration and function as viewed from the OS) of each VM may be somewhat different from the architecture of the host system. Similarly, the architectures of the respective VM's may be different from each other. For example, a machine instruction set of the host system may not be exactly identical to a machine instruction set of each VM. However, a completely different machine instruction set is excluded from the VMS in the present invention because it increases the load of the VMCP and increases the scale of the host system emulation mechanism. The virtual machine VM in the present invention requires that most of the machine instructions can be directly executed with the same performance as that (execution speed) of the host system on the host system without intervention of the VMCP. While only three VM's are shown in FIG. 2, any number of VM's may be included and the upper limit thereof is determined by compromise between the resource capacitance of the host system and the performance of the VM. The host system has a privileged state and a nonprivileged state. A machine instruction which imparts a significant influence to the system (e.g. I/O instruction or system interrupt mask change instruction) is called a privileged instruction and it can be used only in the privileged state. This is well known in the art.

FIG. 3 shows the memory hierarchy of the virtual machine VM1 of FIG. 2. Numeral 2060 denotes a virtual space generated by the OS1 on the VM1. The OS1 exists on the main memory 2000-1 of the VM1. The main memory 2000-1 of the VM1 is copied on the main memory 2002 of the host system. (The main memory 2000 of the host system is divided into a hardware system area 2001 and a programmable area 2002 as shown in FIG. 7.). The copy is given by an address translation table 2010. FIG. 4a shows an address translation table 2010(1). The address translation table contains entries corresponding to addresses v2 on the main memory 2000-1 of the VM1 and corresponding addresses r on the main memory 2002. A start address of the address translation table 2010(1) is stored in one control register (Real Address Translation Table Origin Register (RATOR)) 1110 of basic control registers 1100 (see FIG. 7) in the CPU 1000 when the OS1 on the VM1 operates on the main memory 2000-1. In the present case, the address translation table 2010(1) exists on the main memory 2000-1 of the VM 10000-1, that is, on the main memory 2002 of the host system, and the start address is set in the register 1110 described by an address in the main memory 2002 of the host system.

Numeral 2060 in FIG. 3 denotes a virtual storage generated by the OS1 on the VM1 and a copy thereof to the main memory 2000-1 of the VM1 is given by an address translation table 2040 managed by the OS1. FIG. 4b shows a format of the address translation table. It contains entries corresponding to addresses v3 on the virtual storage 2060 and corresponding addresses v2 of the main memory 2000-1 of the VM1. A start address of the address translation table 2040 is stored in one control register (VATOR) 1120 of the basic control registers 1100 (see FIG. 7) of the CPU 1000 when the OS1 of the VM1 is running on the virtual storage 2060. In the present case, since the address translation table 2040 exists on the main memory 2000-1 of the OS1, the start address is described by an address system of the main memory 2000-1 of the OS1. The address translation table 2010(1) (called a translation table A) is managed and updated by the VMCP for the VM's, and the address translation table 2040 (called a translation table B) is managed and updated by the OS on each VM for its own virtual storage. The main memory 2002 of the host system is referred to as a level 1 memory, the main memory 2000-N (N=1, 2, 3, ...) of each VM is referred to as a level 2 memory, and the virtual storage 2060 generated by the OS on each VM (usually the OS generates a plurality of virtual storages) are collectively referred to as a level 3 memory. The virtual storage is usually divided into pages of a predetermined size (e.g. 4KB) and mapped into the main memory for each page, and a certain number of continuous pages (e.g. 256 pages, 1MB) are called one segment, as is well known in the art. Numeral 2020 in FIG. 3 denotes I/O operation command words (CCW) generated by the VMCP to start its own I/O operation. Since the VMCP operates on the level 1 memory, the CCW 2020 is generated at the level 1 memory address. It is called a level 1 CCW. The level 1 CCW need not be address-translated, and when an I/O start command is issued to the level 1 CCW, it is directly interpreted by the IOP 3000 and sent to the IOC 4000. The IOC 4000 executes each CCW for each I/O device. Numeral 2030 denotes a CCW prepared by the OS on the VM and is described by the level 2 memory address. The level 2 CCW is prepared by the OS on the VM. When an I/O start instruction is issued to the CCW from the OS on the VM, it may be translated to an equivalent level 1 CCW through the VMCP and the I/O start may be effected by the equivalent level 1 CCW through the VMCP. However, this leads to increase an overhead of the VMCP. Accordingly, in the alternative method, the VMCP intervenes to indicate an address of the address translation table from the level 2 memory to the level 1 memory (translation table A) to the IOP 3000, and the IOP 3000, looking up the translation table 2010, translates the data address in the level 2 CCW (or level 2 memory address) to the level 1 memory address. In this method, the intervention of the VMCP is reduced and the overhead is reduced. The OS on the VM in many cases executes on the level 3 memory and hence the CCW generated by the OS on the VM in many cases exists on the level 3 memory. Numeral 2050 in FIG. 3 denotes a CCW described by the level 3 memory address, that is, a level 3 CCW. When the start I/O instruction is issued to the level 3 CCW by the OS on the VM, it indicates an address of the address translation table from the level 3 memory to the level 2 memory (translation table B) and the address of the translation table from the level 2 memory to the level 1 memory (translation table A) to the IOP 3000 (FIG. 7), and the IOP 3000 looks up the translation table B to translate the data address of the level 3 CCW (level 3 memory address) to the level 2 memory address and looks up the translation table A to translate the translated level 2 memory address to the level 1 address in order to execute the CCW.

FIG. 4c shows an address translation buffer 3030 provided in a local storage in the IOP 3000 (FIG. 7) to reduce the address translation overhead in the IOP 3000. A field 1 of the address translation buffer 3030 contains VM numbers (VM #), a field 2 contains start addresses of the translation table A and the translation table B, a field 3 contains identification flags thereof, a field 4 contains CCW data addresses before translation and a field 5 contains level 1 memory addresses after translation. The IOP 3000 (FIG. 7) looks up the address translation buffer to translate the address, and if it is not found, looks up the translation table B and the translation table A to translate the address and register the translated address in the translation buffer 3030. The address translation buffer is a high speed local storage in the IOP 3000 and it is faster than the speed of looking up the translation tables B and A on the main memory 2002. It should be noted that the level 2 CCW, the level 3 CCW and the data buffers thereof should be fixed on the level 1 memory during the I/O execution. FIG. 5 illustrates a manner of dividing a continuous area of the main memory 2002 of the host system to use the divided sub-areas as the main memories for the respective VM's. When such VM's are used, a predetermined address displacement $\alpha$ is added to the address of the main memory of the VM to obtain the address of the main memory 2002 of the host system. In FIG. 5, the address displacement for the VM1 is $\alpha_1$ and the address displacement for the VM2 is $\alpha_2$. In this case, the address translation 2010 from the level 2 memory address to the level 1 memory address may be a mere table to manage lower limit addresses and upper limit addresses of the respective VM's, as shown by 2010(2). In this case, it is easy to address-translate the level 2 CCW and an entry of the address translation buffer 3030 for the level 2 CCW (entry of "0" field 3 of the address translation buffer 3030) is not necessary. Alternatively, as shown in FIG. 5, the translation table 2010(2) is read into the local storage in the IOP 3000 (FIG. 7), the address displacement $\alpha$ is obtained by the VM # and it is added to translate the address (translation from the level 2 memory address to the level 1 memory address). A high speed VM mode is provided for the VM in which the entire main memory of the VM (FIG. 3) is resident in the main memory 2002 of the host system and fixed therein or it occupies a continuous area of the main memory of the host system as shown in FIG. 5. In the high speed VM mode, most privileged instructions issued by the OS on the VM are directly executed (execution without the VMCP in the almost same performance as that of the host system). However, the I/O instruction on the VM requires the intervention by the VMCP as will be described later.

Referring to FIG. 6, a manner in which the start IO instruction issued by the OS on the VM is executed by the VMCP is explained. The OS on the VM designates a sub-channel number (sub-channel #) which corresponds to the I/O device to issue the start I/O instruction. Since this sub-channel # is one under the VM, it is called a virtual sub-channel #. The VMCP translates it to a corresponding real sub-channel #. The correspondence is determined at the time of defining the VM. The VMCP checks the level of the CCW to which the start I/O instruction was issued by the OS on the VM. Usually, it is represented by an operand of the start I/O instruction. Let us assume that the start I/O instruction is issued to the level 3 CCW. In FIG. 6, the CCW 2810 is the CCW on the level 2 memory and the data address thereof is the level 3 memory address. The VMCP adds the operand 2800 to the CCW 2810 generated by the OS to issue the start I/O instruction. The operand 2800 contains a field L indicating the level of the CCW. When L=3, CCWs (2810) are the level 3 CCWs, and the operand 2800 contains the start address (VATOR) of the translation table B, a segment size (SS) and a page size (PS) of the level 3 memory which is the virtual space created by the OS on the VM. It also contains the start address RATOR of the translation table A, a segment size (SS), a page size (PS) of the level 2 memory when the level 2 memory is the virtual space created by the VMCP, and also contains an address to the CCW (2810). They are sent to the IOP 3000 (FIG. 7) through the line 200 upon the issuance of the start I/O instruction by the VMCP and basic information is set in the corresponding sub-channel register 3011. Similar basic information is stored in the corresponding sub-channel control block in the sub-channel control blocks 2090 shown in FIG. 7. (See sub-channel control block 2091 of FIG. 10). The IOP 3000 (FIG. 7) uses the address translation table in the sub-channel to execute the CCW 2810 generated by the OS while it translates the address.

FIG. 7 shows a hardware configuration in the prior art VMS and a block diagram concerning the I/O execution. A CPU 1000 includes a prefix register 1010 including an address of an area prefix (PSA) containing hardware interrupt information, CPU control registers 1100 and a program status word (PSW) 1020 containing a CPU basic status (such as an interrupt control bit or a machine instruction address to be executed next). It also includes an I/O instruction execute circuit 1030, an I/O interrupt circuit 1040, an I/O instruction execution microprogram 1050 and an I/O interrupt processing microprogram 1060. The V-bit representing a VM mode is present in 1090 as a VMS flag. During the running of VM, this bit is set to "1" by the VMCP. The high speed VM mode flag H exists in 1090. The VMS control flag 1090 may be in another form. For example, a VMCP mode (hypervisor mode) and a VM mode may be provided and the VM mode may include the preferred or high performance VM mode and the non-preferred VM mode. They are more or less similar, as described above, the IOP 3000 executes the level 3 CCW or the level 2 CCW (see FIG. 3) while using the information of the address translation buffer 3030 (see FIG. 4C) under the control of the microprogram 3020 in accordance with the address translation information (FIG. 6) contained in the sub-channel control blocks 2090 and the sub-channel registers 3010. The main memory 2000 in FIG. 7 is divided into a hardware system area (HSA) 2001 and a programmable area 2002. The HSA 2001 contains hardware information to be used by the CPU 1000 and the IOP 3000 and it can be accessed and updated by the microprograms 1050, 1060 and 3020 of the CPU and the IOP but cannot be accessed by a machine instruction opened to a normal user of the CPU 1000. The programmable area 2002 can be accessed by a machine instruction and it is a main memory area as viewed from the OS or the VMCP. I/O instruction, such as start I/O instruction, and step I/O instructions request the operations of the I/O devices, and these I/O requests issued from those I/O instructions are queued in an I/O request queue 2070 in a form of request queue. It comprises control blocks 2071 containing I/O request real sub-channel numbers interconnected by address pointers. After queuing to the I/O request queue, a start signal is sent to the IOP 3000 through the line 200. The IOP 3000 accesses the I/O request queue 2070 in the HSA 2001 and sequentially reads out request queue elements 2071 to process the I/O request. The I/O interrupt request is queued in the I/O interrupt request queue 2080 in the priority order of real interruption. A structure therefor is shown in FIG. 9. Eight interruption priority orders 0, 1, 2, 3, 4, 5, 6 and 7 are available and they are assigned by the operands together with the sub-channel numbers when the I/O instructions are issued. FIG. 10 shows a sub-channel control block 2091 in the sub-channel control blocks 2090 (FIG. 7). The sub-channel control blocks are arranged in the order of the real sub-channel numbers and their locations are uniquely determined by the real sub-channel numbers. The start address of the sub-channel control block 2090 is set in one control register in the control registers 1100 of the CPU 1000 (FIG. 7). The interruption priority order can be assigned to each sub-channel. Let us assume that the OS on the VM issues the I/O instruction while designating the sub-channel number and one of the interruption priority orders 0-7. Since the VM mode bit 1090 in FIG. 7 is "1", the I/O instruction executing μp(microprocessor) 1050 transfers the control to the VMCP. The control is transferred to the VMCP by a new PSW in the PSA 2100 of the VMCP as a kind of interruption. Since the address of the PSA of the VMCP has been set in the VMCP prefix register 1010 (FIG. 7) when the VM was started, it is referred to.

The VMCP handles the sub-channel number designated by the OS on the VM as a virtual sub-channel number, translates it to a real sub-channel number, manages a real sub-channel status and if the real sub-channel is available, designates the address translation information 2800 shown in FIG. 6 and issues an I/O instruction in place of the OS on the VM.

The interruption priority order designated by the OS on the VM is the virtual interruption priority order. The VMCP issues the I/O instruction while using the virtual interruption priority order as the real interruption priority order. Accordingly, the real interruption priority order is shared by the OS's on the VM's. Accordingly, the I/O interrupt requests from the sub-channels of the OS's on the VM's are mixedly queued in the real interruption priority order queue of the I/O interrupt request queue 2080 of FIG. 9.

The reasons for intervention by the VMCP to the execution of the I/O instruction from the OS on the VM are as follows.
(i) The virtual sub-channel number designated by the OS on the VM must be translated into the real sub-channel number.
(ii) Since the real sub-channel may be shared by the OS's on the VM's, sub-channel scheduling therefor is required.

FIG. 11 shows a manner of controlling the I/O interruption. The I/O interrupt request from the sub-channel is detected by the IOP 3000 and the corresponding sub-channel control block is queued in the I/O interrupt request queue 2080 (see FIG. 7). A structure of the I/O interrupt request queue is shown in FIG. 9, and the sub-channel control blocks are queued in the order of the real interruption priority. A bit of a corresponding real interruption pending register 1042 shown in FIG. 11 is set to "1". When the bit of the interruption pending register 1042 and the bit of the corresponding real interruption priority order mask register 1041 are both "1" and an I/O mask of the PSW 1020 is "1", the I/O interruption is initiated for the corresponding real interruption priority order and the control is transferred to the I/O interrupt processing microprogram 1060. The above operation in carried out by a hardware circuit shown in FIG. 11.

In the VMS, the real interruption priority order is shared by the OS's on the VM's as described above. Accordingly, during the running of the VM, the bits of the real interruption priority order mask register 1041 are set to the OR function of the interruption priority order masks of the OS's on the VM's or to "1" so that the interruption is always accepted. The I/O mask of the PSW 1020 is also set to "1". Consequently, if a bit of the real interruption pending register 1042 is changed to "1" by the I/O interrupt request from the sub-channel, an output of the one of AND gates 1046 becomes "1", an output of an OR gate 1043 becomes "1" and an output of an AND gate 1044 becomes "1" so that the I/O interrupt processing microprogram 1060 is immediately started by the I/O interrupt circuit shown in FIG. 11. The I/O interrupt processing microprogram 1060 dequeues the sub-channel queued in the corresponding highest interruption priority order I/O interrupt request queue (FIG. 9) to reflect the interruption to the prefix of the VMCP. If the interrupt request queue of the real interruption priority order is vacant, the bit of the real interruption priority order real interruption pending register 1042 is set to "0". As a result, the interruption pending is cleared. By the reflection of the interruption to the VMCP, the control is transferred to the I/O interrupt processing program of the VMCP. The real subchannel number which requested the I/O interruption as the I/O interrupt parameter and the corresponding VM number are also transferred to the VMCP. The VMCP carries out the following processing to reflect the I/O interruption to the VM.

(i) Translates the real sub-channel number to the virtual sub-channel number.

(ii) Checks the interruption priority mask register of the VM and the I/O mask of the PSW to determine if the I/O interruption is acceptable.

(iii) If the VM accepts the interruption, the interruption is indicated to the prefix PSA of the VM.

(iv) If the VM does not accept the interruption, the interruption is made pending by the VMCP.

Since the real interruption priority order is shared by the VM's, the mask must be set to an OR function (usually "1") of the corresponding masks of the VM's. As a result, the VMCP may be interrupted even for the noninterruptable order in the VM. In such a case, the I/O interruption is made pending by the VMCP. Accordingly, simulation by the intervention of the VMCP is required for the I/O instruction to the sub-channel.

As described above, in the I/O execution of the OS on the VM in the prior art virtual machine system, the function of the IOP for directly executing the level 3 CCW and the level 2 CCW exists but the VMCP always intervenes and the simulation is required. Accordingly, the simulation overhead of the VMCP increases for a load having a high I/O issuance frequency.

SUMMARY OF THE INVENTION

It is an object of the present invention to reduce the simulation overhead of an I/O instruction and the I/O interruption of the OS on the VM by VMCP and support direct execution of the I/O instruction on the VM and the I/O interruption by hardware and microprogram.

In accordance with the present invention, in a system having a virtual machine system (VMS) in which at least one operating system can be simultaneously run under one real computer system (host system) and a control program (VMCP) for controlling the VMS, whether an I/O device of the host system is dedicated to or occupied by an OS or not in accordance with information stored in the real computer system is determined, and if the I/O device designated by an I/O instruction other than an I/O start instruction issued by the OS is dedicated to the OS which is currently being run, the I/O instruction is issued to that I/O device, and if it is not dedicated to the OS which is currently running, the OS is interrupted and control is transferred to the VMCP.

BRIEF DESCRIPTION OF THE DRAWINGS

The present invention will be apparent from the following detailed description taken in conjunction with the accompanying drawings, in which:

FIG. 3 shows a memory hierarchy in a prior art virtual machine (VM);

FIGS. 4–11 show prior art examples in which;

FIGS. 4A to 4C show address translation tables;

FIG. 5 shows the VM main memory which occupies a continuous area of a real main memory;

FIG. 6 shows an operand of an I/O instruction issued by a VMCP to simulate the I/O of the VM; and sub-channel registers;

FIG. 7 shows a configuration of a host system;

FIG. 8 shows an I/O request queue;

FIG. 9 shows an I/O interrupt request queue;

FIG. 10 shows real sub-channel control blocks;

FIG. 11 shows an I/O interrupt circuit;

FIGS. 12 to 22 relate to the present invention in which:

FIG. 12 shows a configuration of a host system;

FIG. 13 shows a prefix control table;

FIG. 14 shows a device address translation table and priority order translation table;

FIG. 15 shows a main memory address translation table;

FIG. 16 shows real sub-channel control blocks;

FIG. 17 shows a start VM instruction;

FIG. 18 shows a VM number register;

FIG. 19 shows VMS control flags;

FIG. 22 shows a VMS I/O interrupt circuit.

DESCRIPTION OF THE PREFERRED EMBODIMENTS

Figure 12:
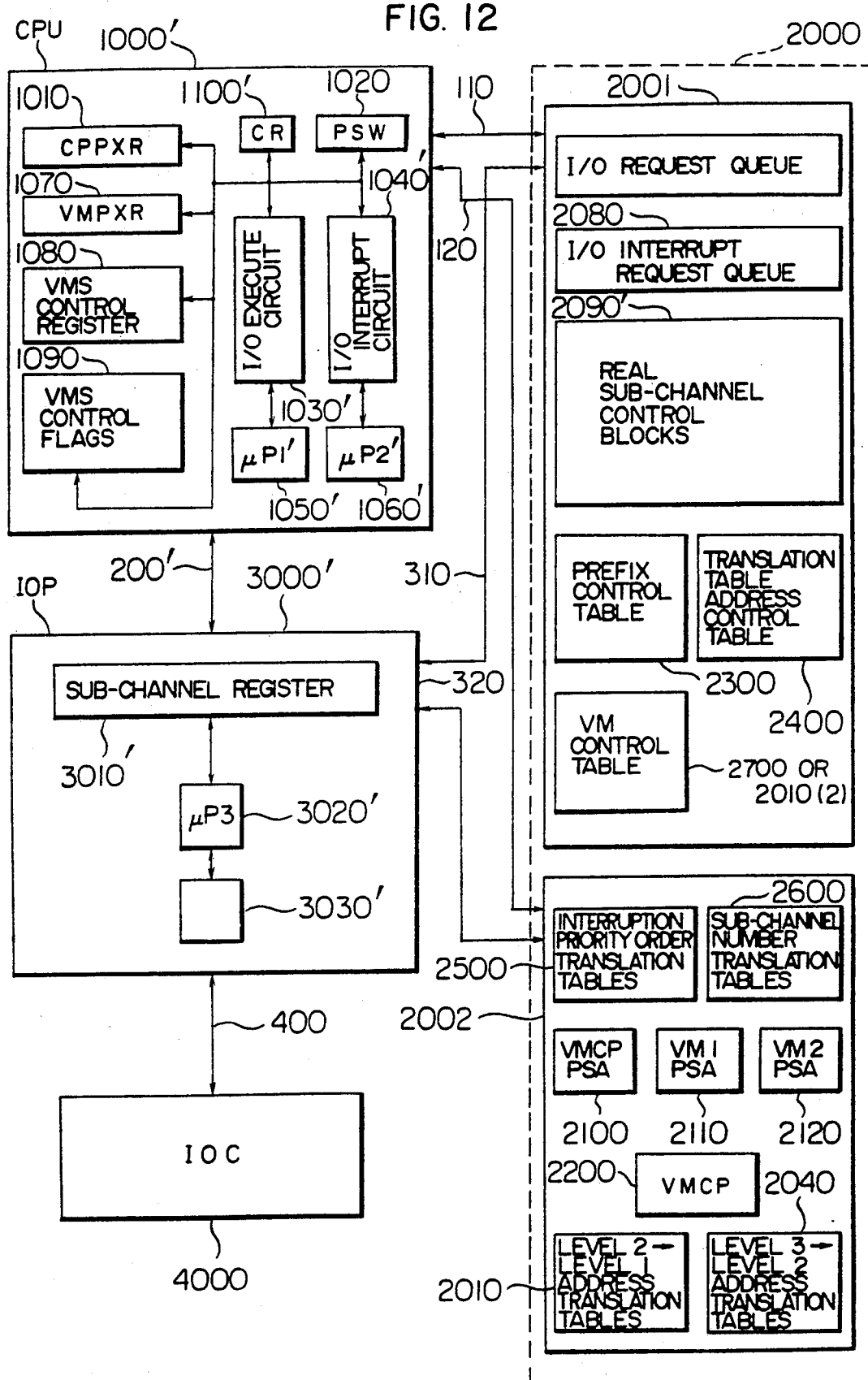

The preferred embodiments of the present invention are now described. FIG. 12 shows an overall configuration of one embodiment of the present invention.

Figure 7:
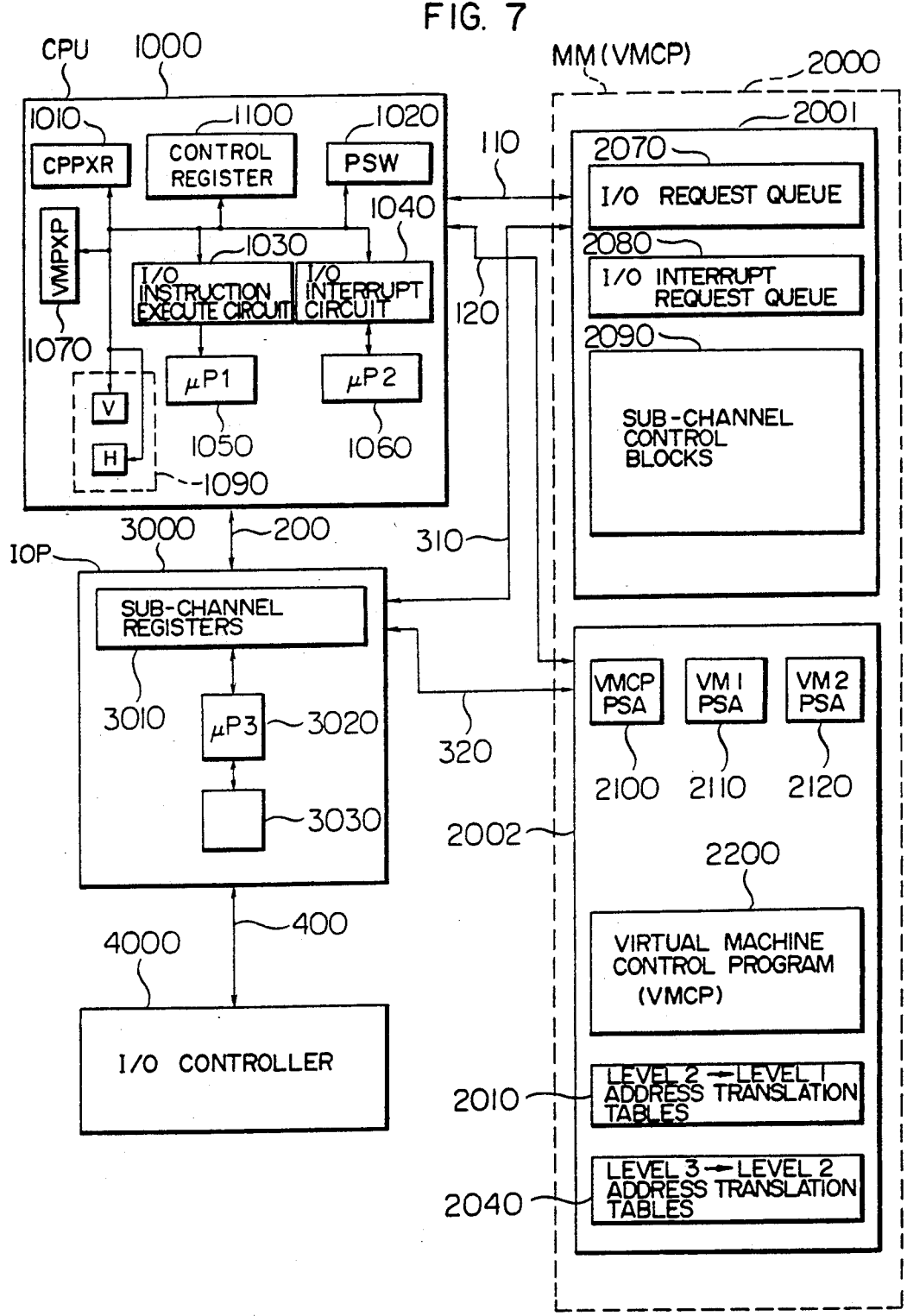

Elements of a CPU 1000' are similar to those of FIG. 7 but some of them are expanded in function. An HSA 2001 includes the same elements as those in FIG. 7. (I/O request queue 2070, I/O interrupt request queue 2080 and real sub-channel control blocks 2090'.). However, a prefix control table 2300, a translation table address management table 2400 and a VM management table 2700 include new information.

A programmable area 2002 includes the same elements as those of FIG. 7 (VMCP PSA 2100, VM1 PSA 2110, VM2 PSA 2120, (PSA's of other VM's), VMCP 2200, level 2 memory to level 1 memory address translation tables 2010 and level 3 memory to level 2 memory address translation tables 2040). However, an interruption priority order number translation table 2500 and sub-channel number translation tables 2600 include new information. An IOP 3000' is similar to the IOP 3000 in FIG. 7 in configuration but expanded in function. The new information included in the HSA 2001 and the programmable area 2002 is now explained.

Figure 13:
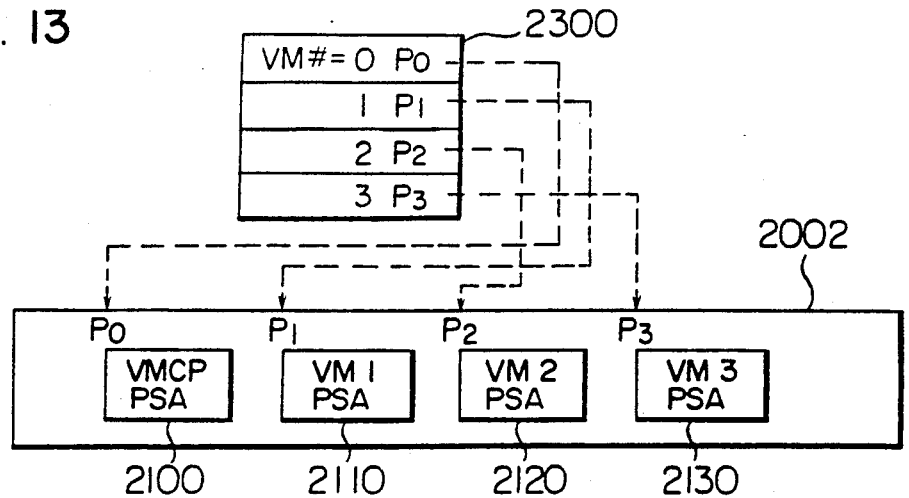
Figure 14:
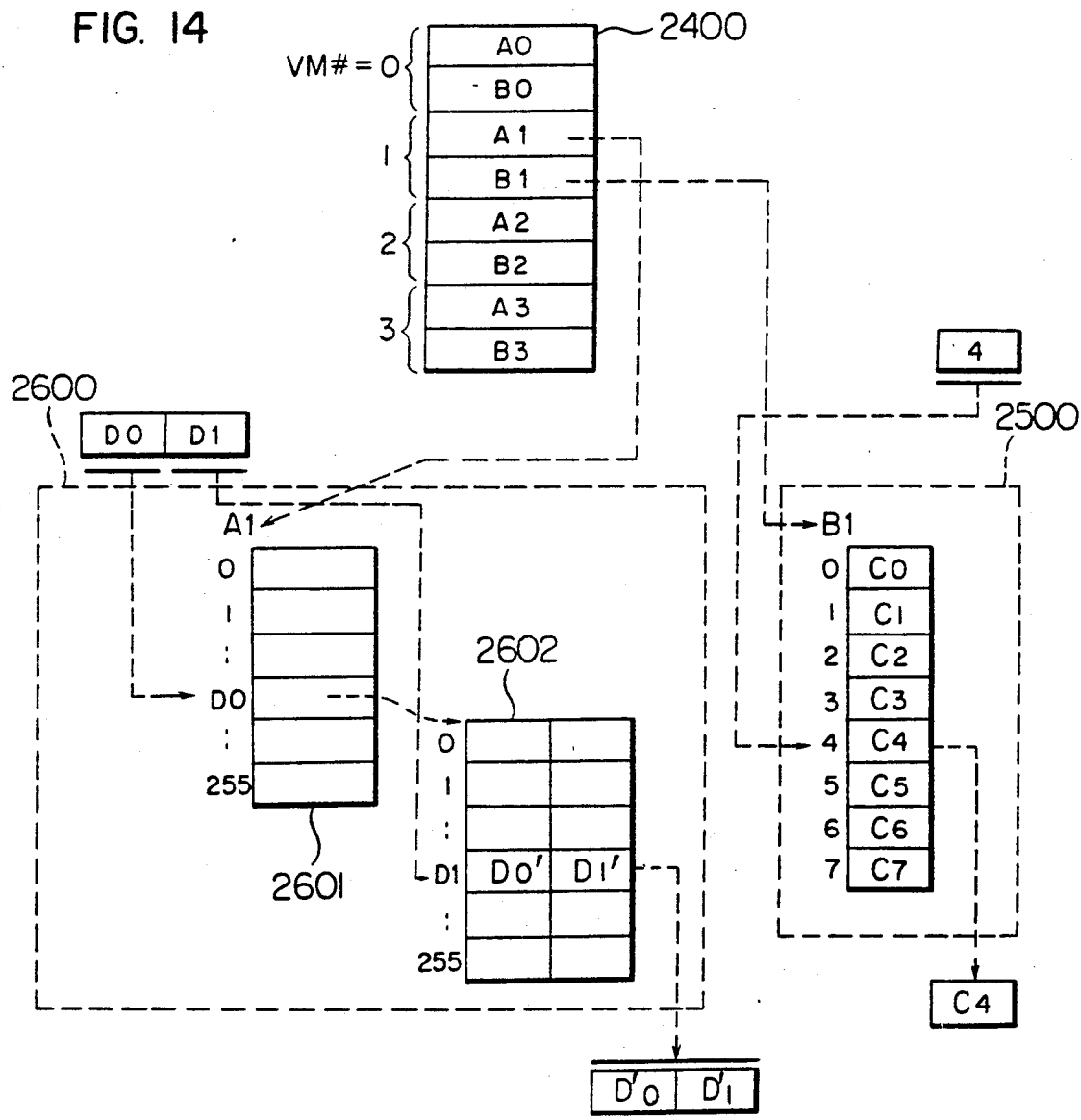

FIG. 13 shows the prefix management table 2300. It includes the VMCP PSA address, VM1 PSA address, VM2 PSA address and VM3 PSA address. While not shown in FIG. 13, other VM PSA's may be registered. The PSA addresses are referred by a microprogram of the CPU 1000' and they are addresses in a host system programmable area 2002. The VM PSA address is imparted as one of start instruction operands when the VM is started and it is stored in the corresponding entry of the prefix management table 2300 when the instruction is executed. A start address of the prefix management table 2300 is stored in one of the control registers 1100' of the CPU 1000' (see FIG. 12). The prefix management table is optional. A case where it is used will be explained later. FIG. 14 shows the translation table address management table 2400. It contains a start address of the sub-channel number translation table 2600 and a start address of the interruption priority order translation table 2500, for each VM. A start address of the translation table address management table 2400 is also stored in one of the control registers 1100' of the CPU 1000'. A method of looking up the sub-channel number translation table 2600 and the interruption priority order translation table 2500 is shown in FIG. 14. A virtual sub-channel number (two bytes) is divided into D0.256 and Dl, and a first half table 2601 pointed to by the content of the corresponding entry of the address management table 2400 is looked up by D0. An address of a second half table 2602 is contained in the D0-th entry of the first half table 2601 so that a D1-th entry of the second half table 2602 is looked up. In this manner, the corresponding real sub-channel number D0'.256+D1' is obtained. The virtual interruption priority order is translated to the corresponding real interruption order by merely reading the corresponding entry of the translation table 2500. The sub-channel number translation table 2600 and the interruption priority order translation table 2500 are prepared by the VMCP when they are designated by the VMCP command or when the VM is defined from the VM defining information, and designated by the start instruction operand when the VM is started, and stored in the corresponding entry of the translation table address management table 2400 when the start instruction is executed. The translation tables 2600, 2500 and 2400 are optional. Those translation tables are not necessary so long as the VM which uses the I/O execution system of the present invention in the VMS obeys a rule of virtual sub-channel number being equal to a real sub-channel number, and virtual interruption priority order being equal to real interruption priority order.

Figure 1:
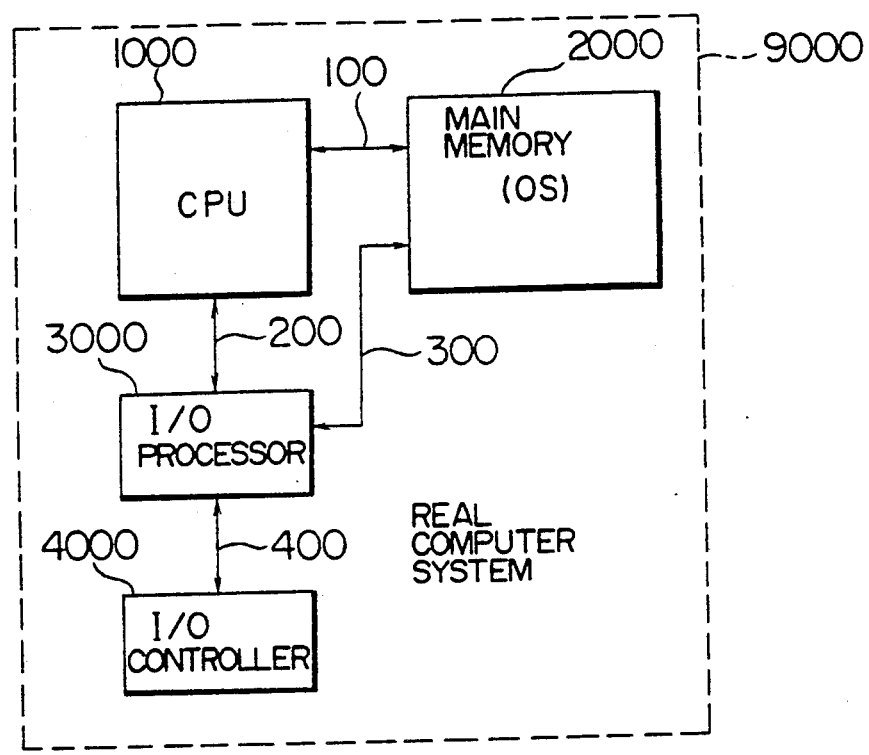
FIG. 1 is a block diagram of a real computer system by a conventional OS.
Figure 2:
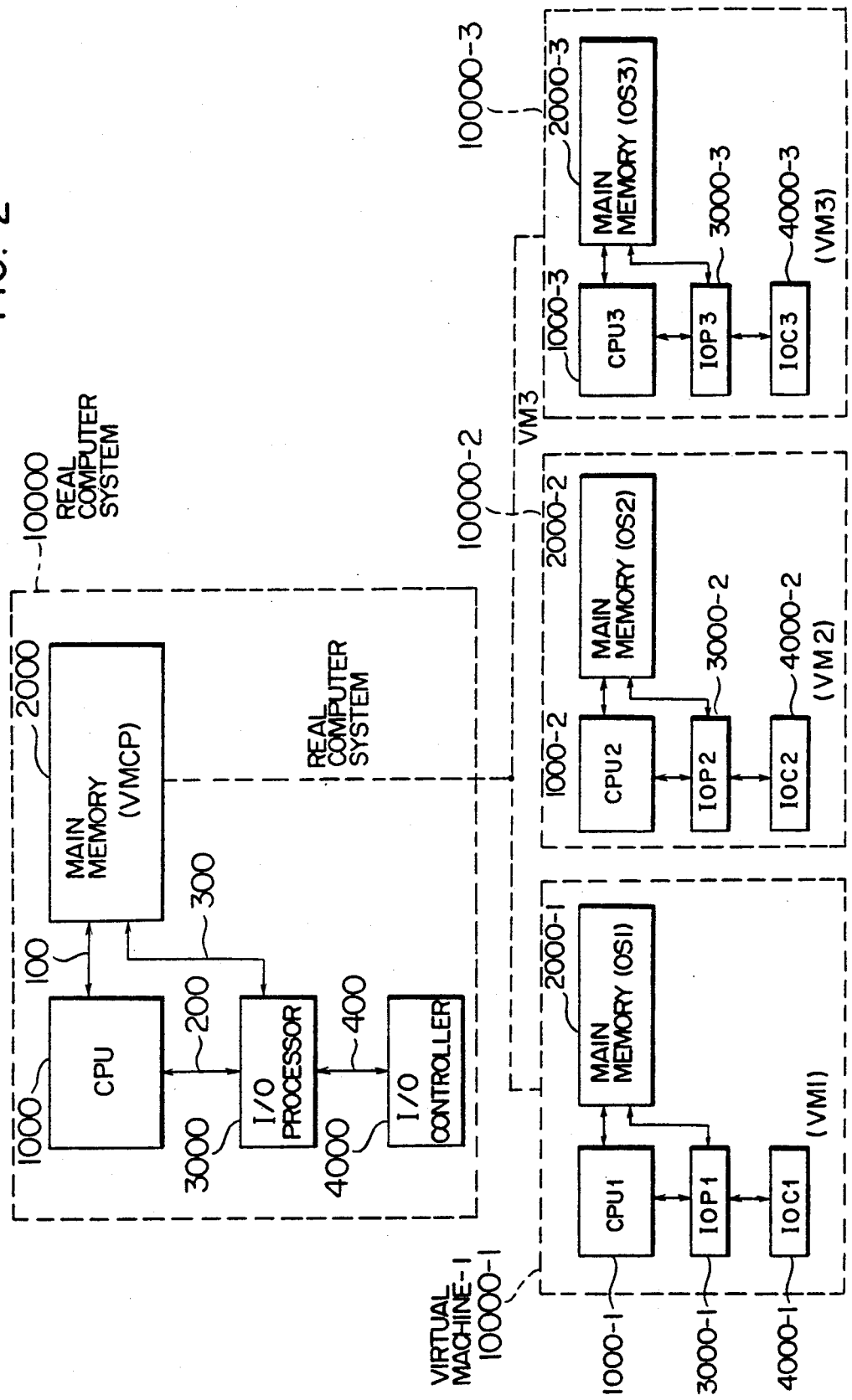
FIG. 2 is a block diagram of a prior art virtual machine system (VMS)
Figure 5:
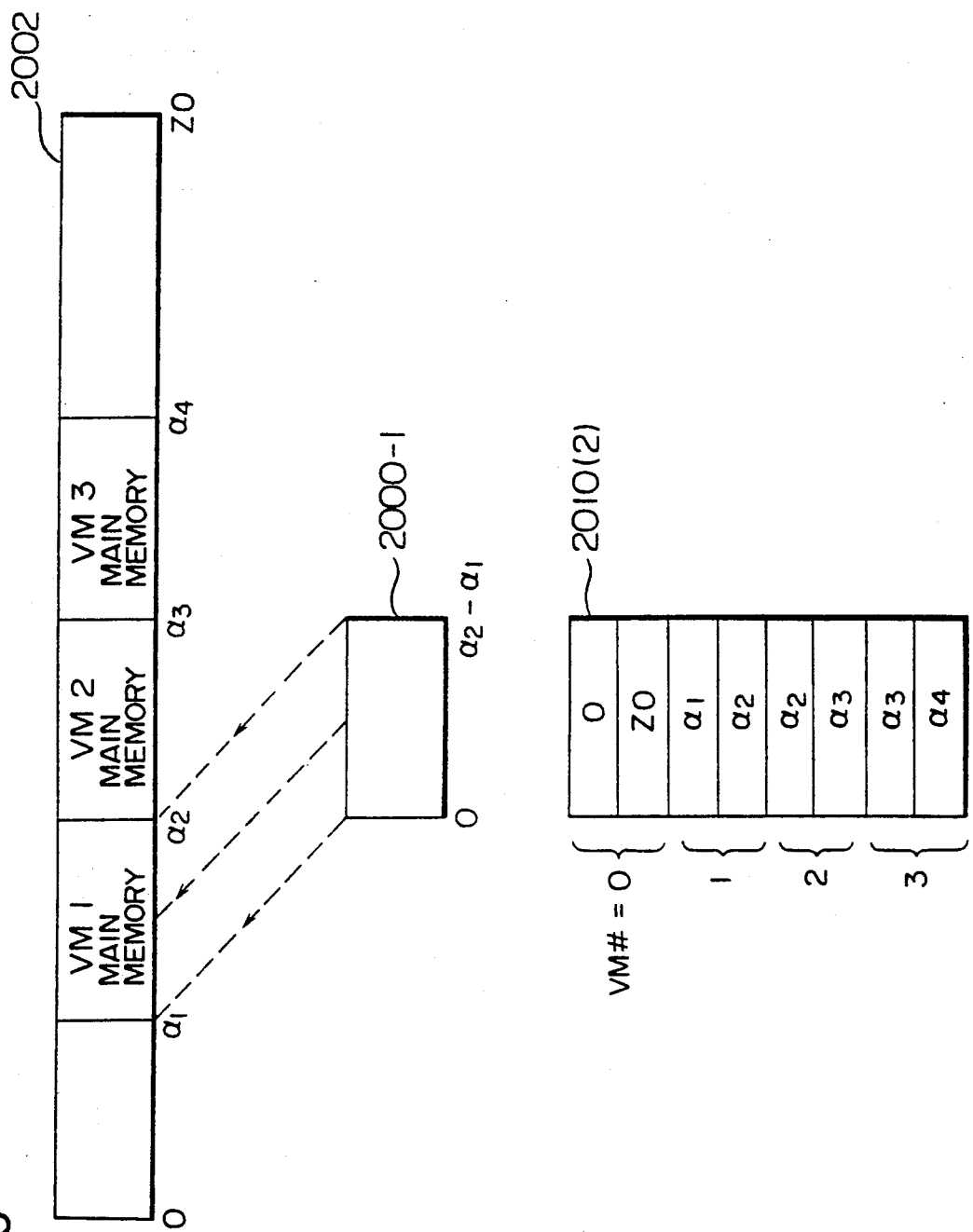
Figure 6:
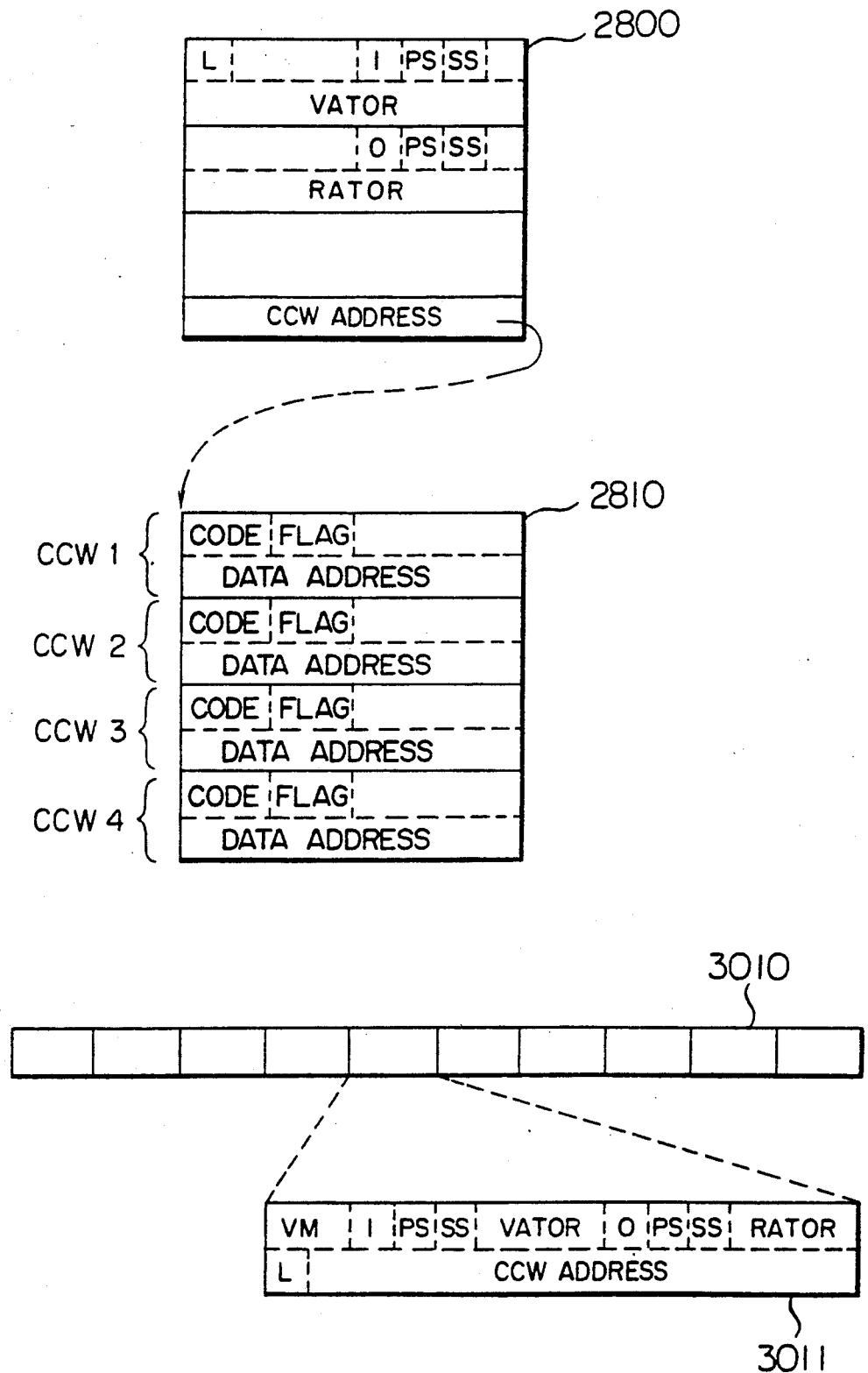
Figure 15:
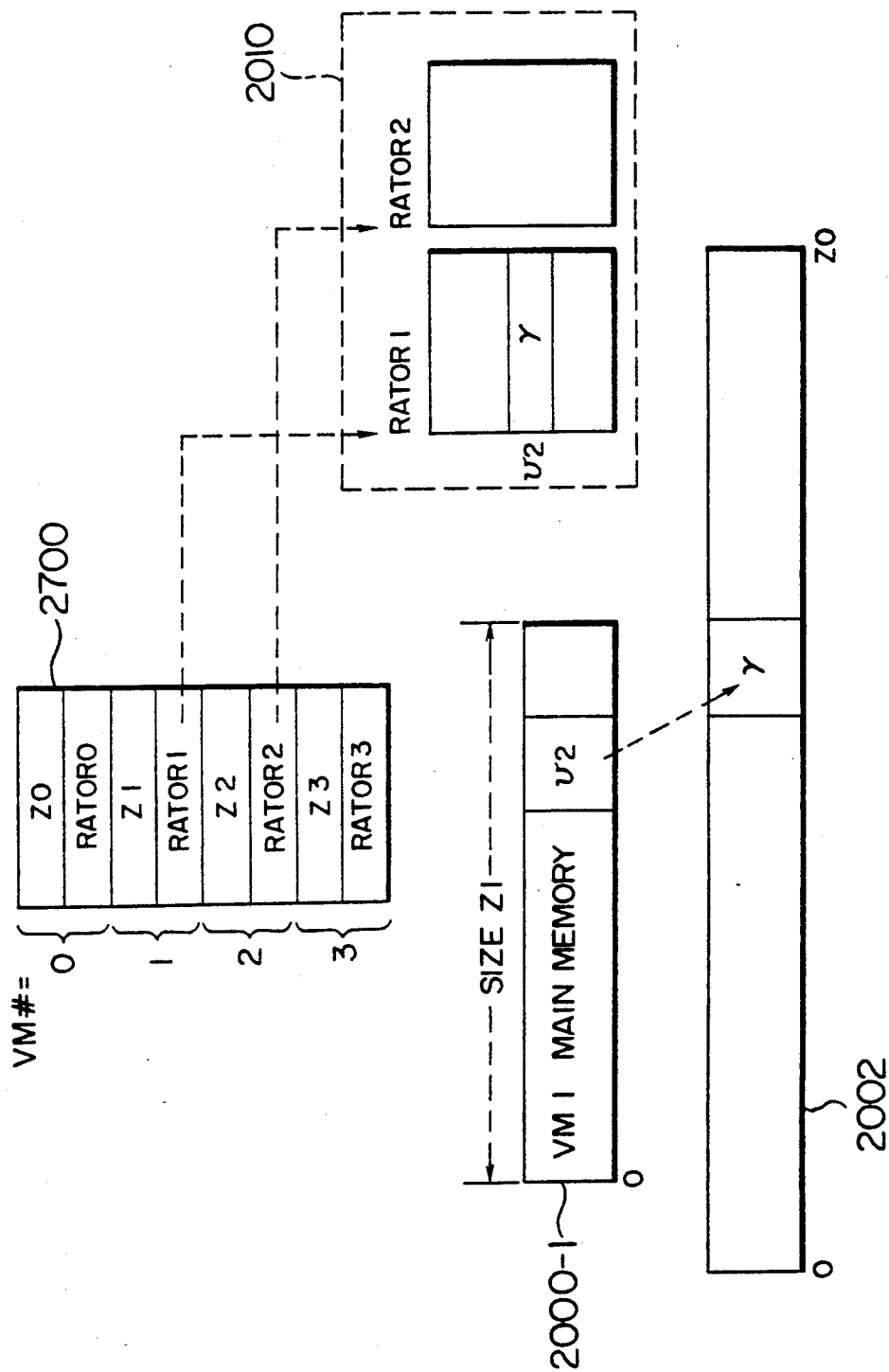
Figure 16:
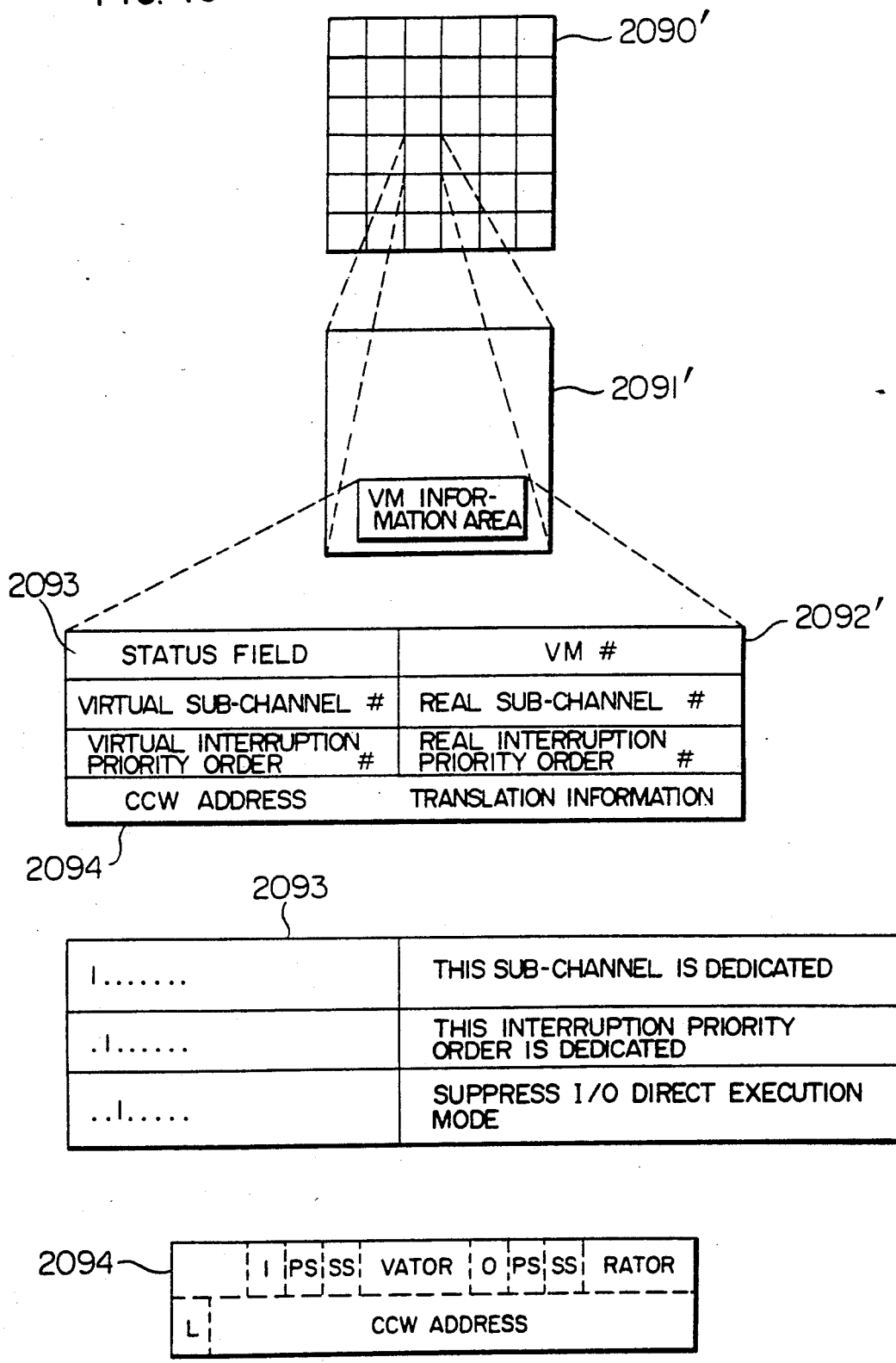

FIG. 15 shows the content of the VM management table 2700. It contains sizes (Z0, Z1, ...) of the main memories of the corresponding VM's, and address (RATOR0, RATOR1, ...) of the level 2 memory address to level 1 memory address translation table 2010. Such information is derived from the VM definition information and stored in the corresponding entry of the VM control table 2700 in the HSA 2001 by the start VM instruction. A start address of the VM control table 2700 is stored in one of the control registers 1100' (see FIG. 12) in the CPU 1000'. A start address of the control block in the HSA 2001 is stored in the control register 1100' in the CPU 1000' as is done in the prior art system. When the VM which supports the I/O execution system of the present invention is limited to one which occupies the continuous area on the main memory 2002 (FIG. 5) as a main memory therefor, the VM management table 2700 may be replaced by a translation table 2010(2) which defines upper and lower limits. When the translation table 2010(2) shown in FIG. 5 is used, the upper and lower limit addresses $a_i$ and $a_{i+1}$ (i=1, 2, 3,...) are designated by the VM start instruction, and the corresponding entry of the translation table 2010 (2) is set in the HSA 2001 as the instruction is executed. FIG. 16 shows the real sub-channel control blocks 2090', one real sub-channel control block 2091' thereof and a VM information area 2092' thereof. The VM information area 2092' includes status field, VM number, virtual sub-channel number, corresponding real sub-channel number, virtual interruption priority order, corresponding real interruption priority order and CCW address translation information 2094. The status field includes flags indicating whether the sub-channel is occupied or not and whether the sub-channel is in an I/O direct execution suppress mode or not. The CCW address translation information 2094 has the same content as the address translation information 2092 of FIG. 10. The information in the VM information area 2092' is set from the VM definition information when the VM is defined, or when it is designated by the VMCP command, or when the I/O instruction is executed.

The dedication of the real sub-channel or the dedication of the real interruption priority order is designated when the VM is defined or by the VMCP command. When a real sub-channel is dedicated, the following fields in the VM information area 2092' are set.

A sub-channel dedication flag in the status field 2093

The I/O direct execution mode suppress flag is normally set to "0" and the I/O direct execution mode is set to a support state.

A VM number to which the sub-channel is dedicated, Virtual sub-channel number and real sub-channel number Start address (RATOR, see FIG. 4a) of the dedicating VM main memory (level 2 memory) to level 1 memory address translation table, in the CCW address translation information 2094. If the VM occupies the main memory shown in FIG. 5, the upper and lower limits thereof $a_i$ and $a_{i+1}$ (i=1, 2, 3, ...) may be set.

In the shared sub-channel, such information is set as required when the I/O instruction is executed. In this case, it is set in the corresponding field on the VM information area of the I/O issuing VM.

Figure 17:
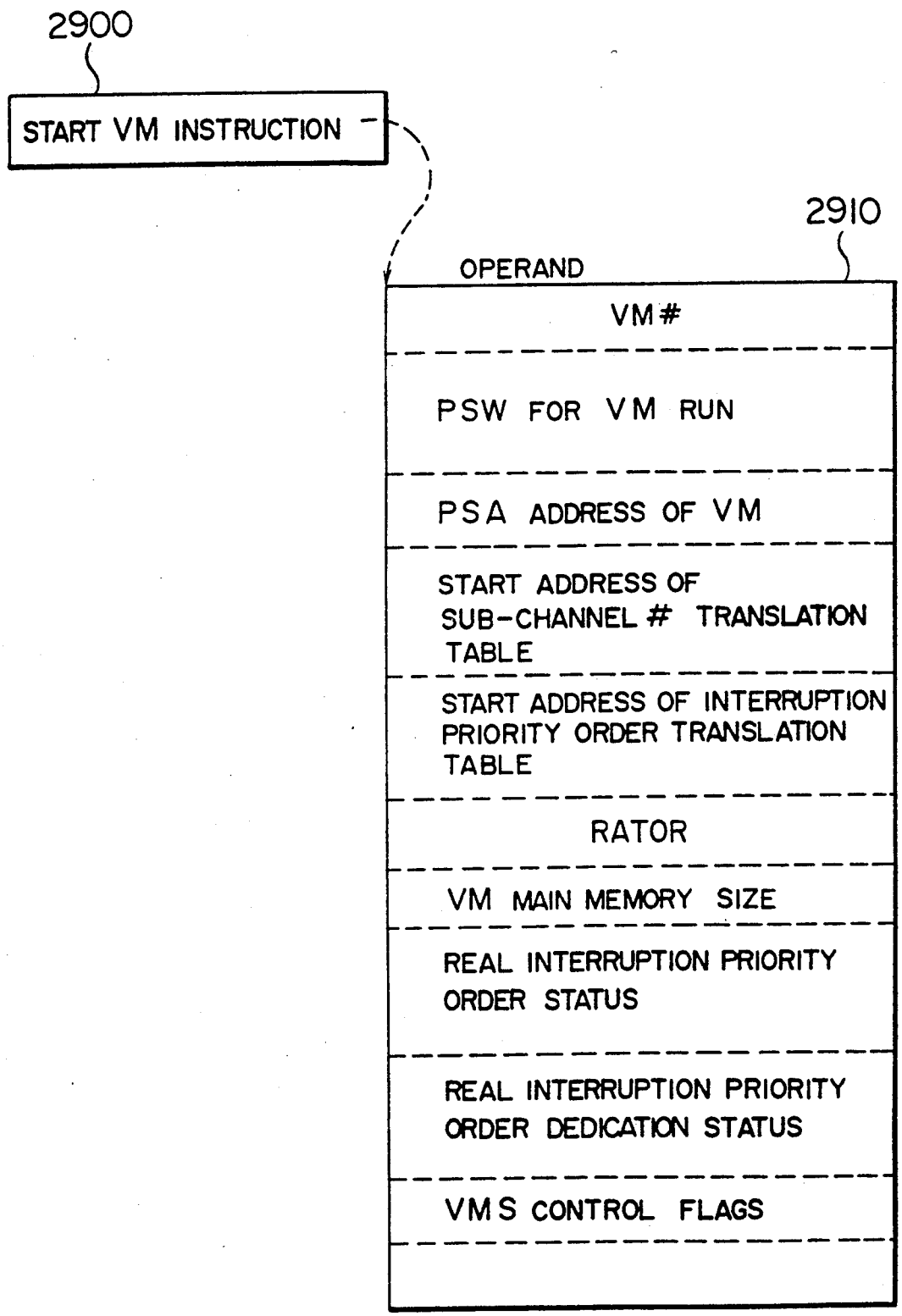
Figure 18:
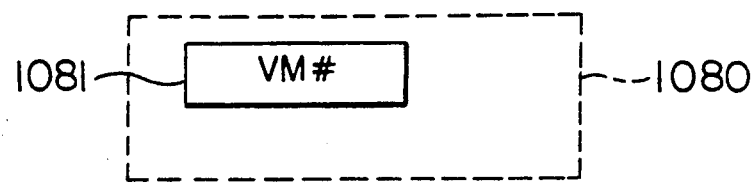
Figure 19:
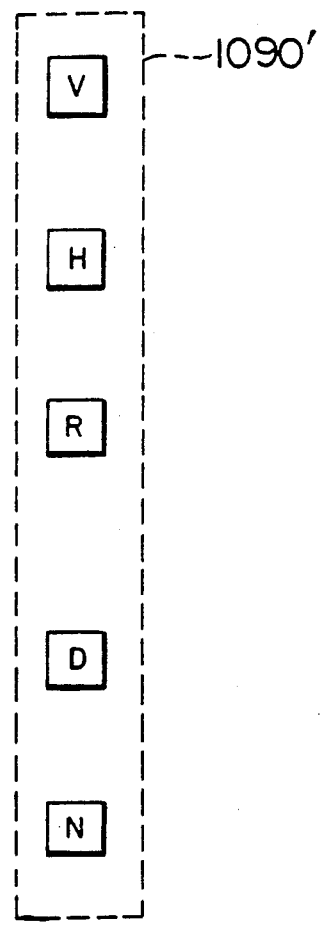

FIG. 17 shows the format of the start VM instruction. Numeral 2900 denotes the start VM instruction and numeral 2910 denotes an operand. The operand 2910 contains the VM number, VM PSW, VM PSA address, start address of the sub-channel number translation table 2600 (FIG. 14), start address of the interruption priority order translation table 2500 (FIG. 14), start address RATOR (see FIG. 4a) of the VM main memory to host system main memory address translation table 2010 (FIG. 15) and VM main memory size. (For the latter two, when the VM to be started uses the continuous area of the main memory 2002 shown in FIG. 5 as the VM main memory, the upper and lower limits $a_i$ and $a_{i+1}$ (i=1, 2, 3, ...) may be designated. Of those operand information, the VM running PSW, VM PSA address, real interruption priority order status and VMS control flags are determined when the VM is started, and other information is determined by the VM definition information when the VM is defined. The real interruption priority order status, real interruption priority order dedication status and VMS control flags will be explained later. Those operands are set by the VMCP. The start VM instruction is not necessarily of the format shown in FIG. 17, although the information shown in FIG. 17 is needed as the operands. FIG. 18 shows a VMS control register 1080. A register 1081 contains the VM number of the currently running VM and is set by the start VM instruction. The content of the register is given by the content of one field of the operand 2910 (FIG. 17) of the start VM instruction. FIG. 19 shows the VMS control flags 1090' (see FIG. 12). The flags are initialized by one field of the operand of the VM start instruction (FIG. 17). The flags have the following meanings, respectively.

V: It is "1" during running of the VM. It is "0" during running of the VMCP or running in the real computer mode. It is set to "1" by the start VM instruction and set to "0" when the control is transferred to the VMCP by the interruption. It is similar to the prior art system (FIG. 7).

H: It is set to "1" when a privileged instruction may be directly executed during the running of VM. When this flag is "1", most privileged instructions in the running of VM are directly executed by the instruction execute circuit of the CPU 1000'. When H is "1", it is a high speed VM mode, similar to the prior art system (FIG. 7).

R: It is set to "1" when the OS on the VM is limited such that the virtual sub-channel number is equal to the real sub-channel number, and the virtual interruption priority order is equal to the real interruption priority order. When this flag is "1", the sub-channel number translation and the interruption priority order translation by the microprogram are eliminated. (In this case, the translation tables 2400, 2600 and 2500 shown in FIG. 14 are not necessary.)

D: It is "1" when the direct I/O execution by the VM (without the intervention of the VMCP) in accordance with the present invention is enabled. It is initially set to "1" by the start VM instruction of the VMCP.

In general, a VM can accept an I/O interruption from an I/O interruption priority order only if both the VM's PSW I/O mask is "1" and the I/O interruption priority order mask of the VM is "1". When the currently running VM has an I/O interruption pending factor on a shared I/O interruption priority order, and the pending is caused by the fact that the shared I/O interruption priority order mask of the VM is "1", and the VM's PSW I/O mask, however, is "0", the N is set to "1". The pending factor is actually managed by the VMCP for the VM.

The N is used when an I/O instruction which checks the I/O interrupt request of the VM is issued from the OS on the VM. That I/O instruction checks the I/O interruption from an I/O interruption priority order whose mask of the VMis "1". The N is initialized by the VMCP by the start VM instruction. It is used when an instruction for checking the I/O interrupt virtual interruption priority order mask is "1" is executed. It is initialized by the VMCP by the start VM instruction.

Figures 20A, 20B:
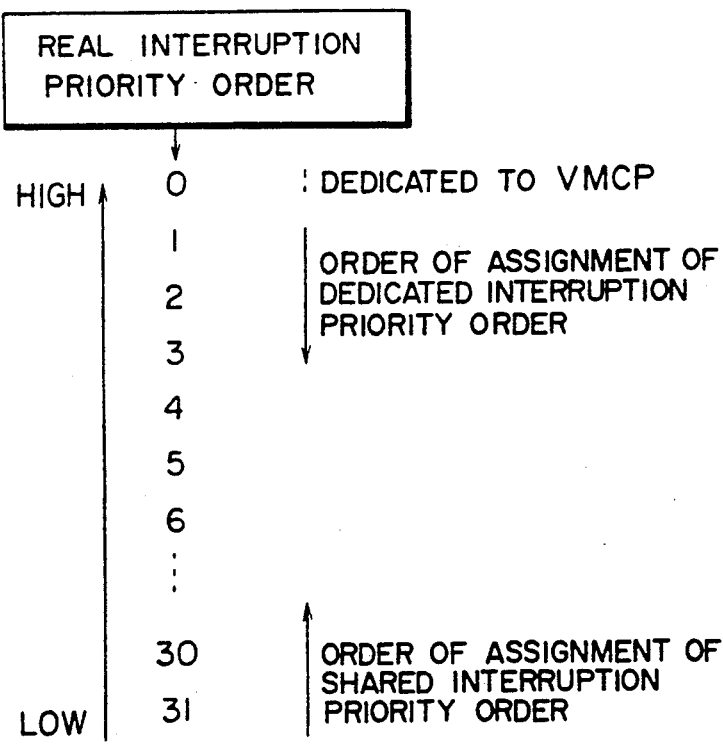
FIGS. 20A and 20B illustrate a manner of assigning interruption priority orders.
Figure 21A:
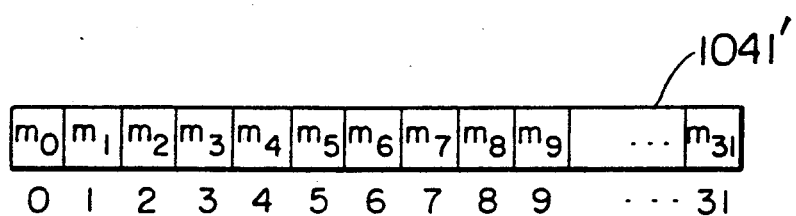
FIGS. 21A –21D shows a VMS interrupt control registers.
Figure 21B:
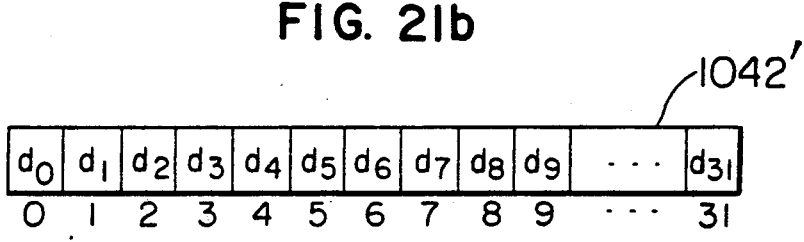
Figure 21C:
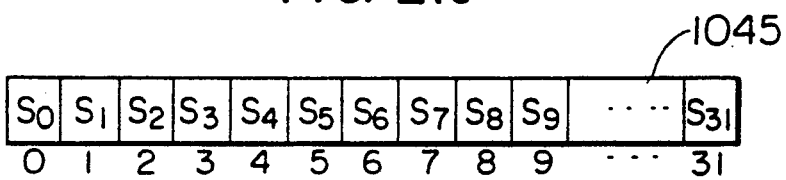
Figure 21D:
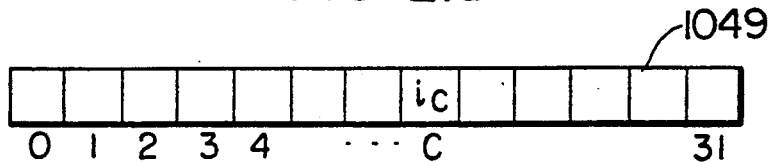

FIGS. 20a and 20b show a method of assigning the real interruption priority orders. 32 real interruption priority orders 0-31 are used. The real interruption priority order 0 is the highest priority order and is exclusively used by the VMCP. The real interruption priority orders to be dedicated to the VM's are assigned to the VM's in the ascending order starting from the real interruption priority order 1 (descending order in the interruption priority order). The shared interruption priority orders are assigned to the VM's in the descending order starting from the real interruption priority order 31 (ascending order in the interruption priority order). In FIGS. 20a and 20b, the real interruption priority order 1 is assigned to the virtual interruption priority order 0 of the VM1 and it is exclusively used, and the real interruption priority order 31 is assigned to the virtual interruption priority orders 1-7 and it is shared by the VM's. For the VM2 and VM3, the assignment is done as shown in FIGS. 20a and 20b. The virtual interruption priority order in the VM1 is actually 0 or (1-7). Accordingly, there are two real interruption priority orders which can be effectively used by the OS on the VM1. The restriction to the OS can be permitted. The particular interruption priority order to be dedicated to the VM should be determined under an overall plan of the VMS and controlled by the VMCP. The exclusive or shared status of the real interruption priority order thus determined is given by the operand of the start VM instruction (see FIG. 17) and set into the real interruption priority order dedicated status register 1049 (FIG. 21) when the instruction is executed.

FIG. 21 shows the real interruption priority order mask register 1041', real interruption pending register 1042', real interruption priority order status register 1045 and real interruption priority order dedication status register 1049. Those are all included in the I/O interrupt circuit 1040' of FIG. 12. The registers 1041' and 1042' are similar to those in the prior art system but have increased number of bits. In FIG. 21, they have 32 bits which are four times as large as 8 bits in the prior art system, in order to support the dedication system of the real interruption priority order in the VM. The explanation thereof is omitted because the meaning is the same. The meaning of the real interruption priority order status register 1045 is described below. It means that when the bit n (0-31) is "0", the real interruption priority order n is dedicated to the currently running VM. In another case, it is set to "1". The content of the real interruption priority order dedication status register 1049 is described below. When a bit c (0-31) is "0", it means that the real interruption priority order c is dedicated to a VM, and when the bit c is "1", it means that the real interruption priority order c is shared. The registers 1045 and 1049 are initialized by the operand of the start VM instruction. The real interruption priority order mask register 1041' is controlled and updated by the VMCP. The real interruption pending register 1042' is set by the IOP 3000' (FIG. 12) and reset by the I/O interrupt processing microprogram 1060' (FIG. 22).

Figure 22:
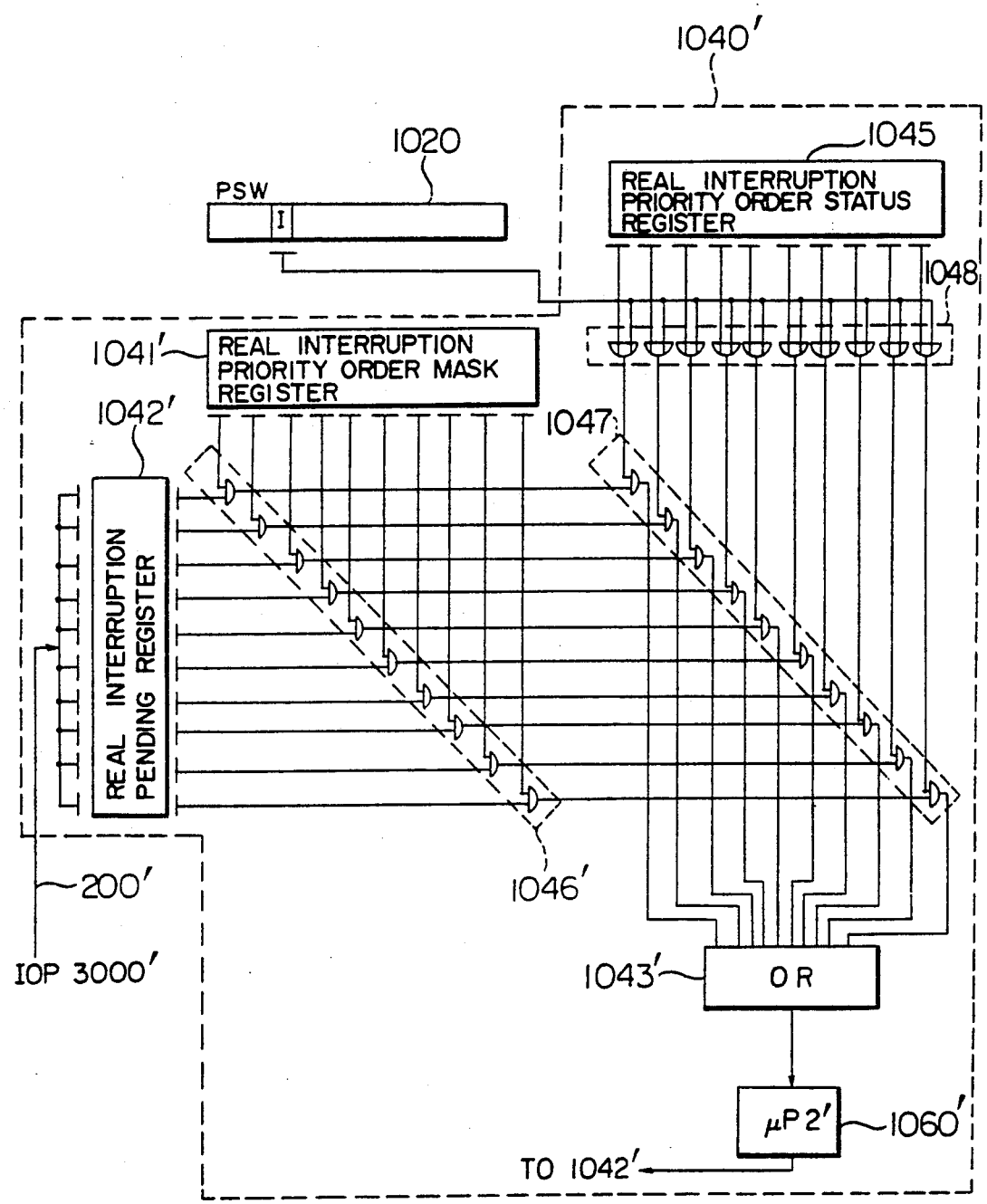

FIG. 22 is a circuit diagram of the I/O interrupt circuit 1040' of the present invention. For the sake of simplicity, only ten real interruption priority orders are shown in FIG. 22 but there are actually 32 orders connected in a similar manner. Let us assume that the real interruption priority order c (c=0-31) has an interruption pending factor (that is, the sub-channel having the interrupt request is queued to the real interruption priority order (c) level queue of the I/O interrupt request queue 2080 and the corresponding bit of the pending register 1042' is set to "1"). If the interruption priority order c is dedicated to the currently running VM, the corresponding bit of the real interruption priority order status register 1045 is zero, and the OR gate 1048 outputs the content of the I/O mask of the PSW so that the I/O interrupt mask of the PSW 1020 is effective. Accordingly, only when the corresponding bit of the corresponding real interruption priority order mask register 1041' is "1" and the I/O mask of the PSW is "1", the corresponding output of the AND gate 1047 is "1", the I/O interruption is started and the control is transferred to the I/O interrupt processing microprogram 1060'. When the interruption priority order c is shared or dedicated to another VM, the corresponding bit of the register 1045 is "1", the corresponding output of the OR gate 1048 is "1" and the I/O mask of the PSW 1020 is ignored so that the I/O interruption is started if the bit of the corresponding real interruption priority order mask register 1041' is "1". After the processing of the interruption by the microprogram 1060', if the interrupt request queue of the interruption priority order c is vacant, the corresponding bit of the pending register 1042' is cleared to "0" by the microprogram.

The manner in which the I/O instruction of the OS on the VM and the I/O interruption are executed and processed by the hardware, microprogram and information on the main memory is now explained.

The following presumptions are made and the VM is in the high speed VM mode.
 (i) The entire main memory of the VM is resident in the main memory of the host system.
 (ii) The direct I/O execution of the OS on the VM (without the intervention of the VMCP, including the direct execution of the I/O interrupt) is supported only for the dedicated sub-channel and the sub-channel having the dedicated interruption priority order.

When the VM is started, the VMCP sets the operand of the start VM instruction of FIG. 17 and the value of the bit c of the real interruption priority order mask register 1041' in a manner shown below.

When the real interruption priority order c (0-31) is dedicated to the currently running VM, its mask is set to the mask of the corresponding virtual interruption priority order (only one is assumed for the sake of simplicity) of the OS on the VM.

When the interruption priority order c is dedicated to other VM, its mask is set to the value of an AND function of the mask of the corresponding virtual interruption priority order of the VM and the I/O mask of the PSW of the VM. Alternatively, the bit c may be set to "0" if the delay of the interruption of the interruption priority order c does not cause a problem.

When the interruption priority order c is shared by the VM's, the bit c is set to "1".

When the virtual interruption priority order mask is changed during the running of the VM, the change is immediately reflected to the real interruption priority order mask register 1041' (FIG. 21). Accordingly, the instruction to change the virtual interruption priority order mask of the OS may be simulated via the VMCP or the change may be reflected to the register 1041' by the microprogram processing of the CPU, as is done in the prior art system. When the VM in the high speed VM mode is started, the PSW of the VM is set in the VM PSW of the operand of the start VM instruction of FIG. 17 and it is set in the PSW 1020 (FIG. 12) of the CPU 1000'. Accordingly, the I/O mask of the PSW coincides with the I/O mask of the running VM. The coincidence is attained because the change of the PSW of the OS during the VM run is immediately reflected to the PSW 1020. The instruction to change the PSW of the OS may be reflected to the PSW 1020 of the CPU 1000' by the direct execution or may be reflected by the simulation via the VMCP. After those settings, the control is transferred to the OS on the VM by the start VM instruction (FIG. 17). As the instruction is executed, the currently running VM number register 1081 of FIG. 18, PSW 1020 (FIG. 12) of the CPU 1000', the corresponding entry of the prefix control table of FIG. 13, the corresponding entry of the translation table address, management table 2400 of FIG. 14, the corresponding entry of the VM management table of FIG. 15, real interruption priority order status register 1045 of FIG. 21 and VMS control flags of FIG. 19 are initialized.

Figure 8:
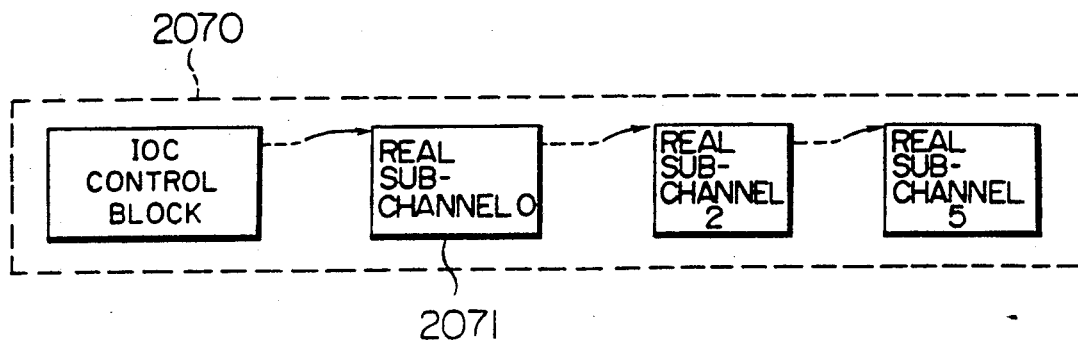

Let us assume that the I/O instruction is issued from the OS on the VM. The I/O execute circuit 1030' of the CPU 1000' carries out the following processings under the control of the microprogram 1050'.
 (1) If not in the high speed VM mode (VMS control flag H="0", see FIG. 19), the OS is interrupted and control is transferred to the VMCP by reflecting the interruption to the PSA 2100 of the VMCP by using the prefix register 1010 of the VMCP (FIG. 12).
 (2) In the high speed VM mode (VMS control flag H="1"), whether the VM is in an I/O direct execution mode (VMS control flag D="1") or not is checked (FIG. 19).
 (3) When D="0", the OS is interrupted and control is transferred to the VMCP.
 (4) When D="1", the VMS control flag R is checked. If R="0", the corresponding virtual sub-channel number translation table 2600 is looked up to translate the given virtual sub-channel number to a real sub-channel number. If the virtual interruption priority order is given by the instruction operand, the interruption priority order translation table is looked up to translate it into the real interruption priority order. Whether it is dedicated or not is checked by the real interruption priority order dedication status register 1049, and it is written into the status field of the VM information area 2092' of the sub-channel control block (FIG. 16). The correspondence between the virtual interruption priority order and the real interruption priority order is also written. When R="1", no translation is required and the same values are written.
 (5) When the real sub-channel control block 2091' (FIG. 16) obtained is the dedicated sub-channel and has the dedicated interruption priority order, the I/O instruction is executed. The subsequent operation is similar to that in the real computer system. When an asynchronous I/O device operation is required, the sub-channel is queued in the I/O request queue 2070 (FIG. 8). A condition code and control are returned to the program which issued the I/O.
 (6) If the real sub-channel obtained is the shared sub-channel or the interruption priority order is shared, the OS is interrupted, control is transferred to the VMCP and the simulation is effected. The remaining processes are entrusted to VMCP's simulation.
 (7) If the I/O instruction issued by the OS on the VM is one which examines an I/O interrupt request whose virtual interruption priority order mask is "1", the following processing is carried out. The interrupt request is checked for the dedicated real interruption priority order of the current running VM. If there is no I/O interrupt request, the shared interruption priority order should be checked. Since the VMCP manages the interrupt pending for the shared interruption priority order, it is necessary to transfer the control to the VMCP. However, since this is contrary to the principle of direct execution, the control flag N (FIG. 19) of the VMS is used. When N="1", it means that VMCP holds the I/O interrupt the shared interruption priority order and its virtual interruption priority order mask is "1". Accordingly, the OS is interrupted and control is transferred to the VMCP. When N="0", there is no such I/O interrupt pending and the OS need not be interrupted and the direct execution is permitted. The I/O interrupt processing is now explained.

Figure 9:
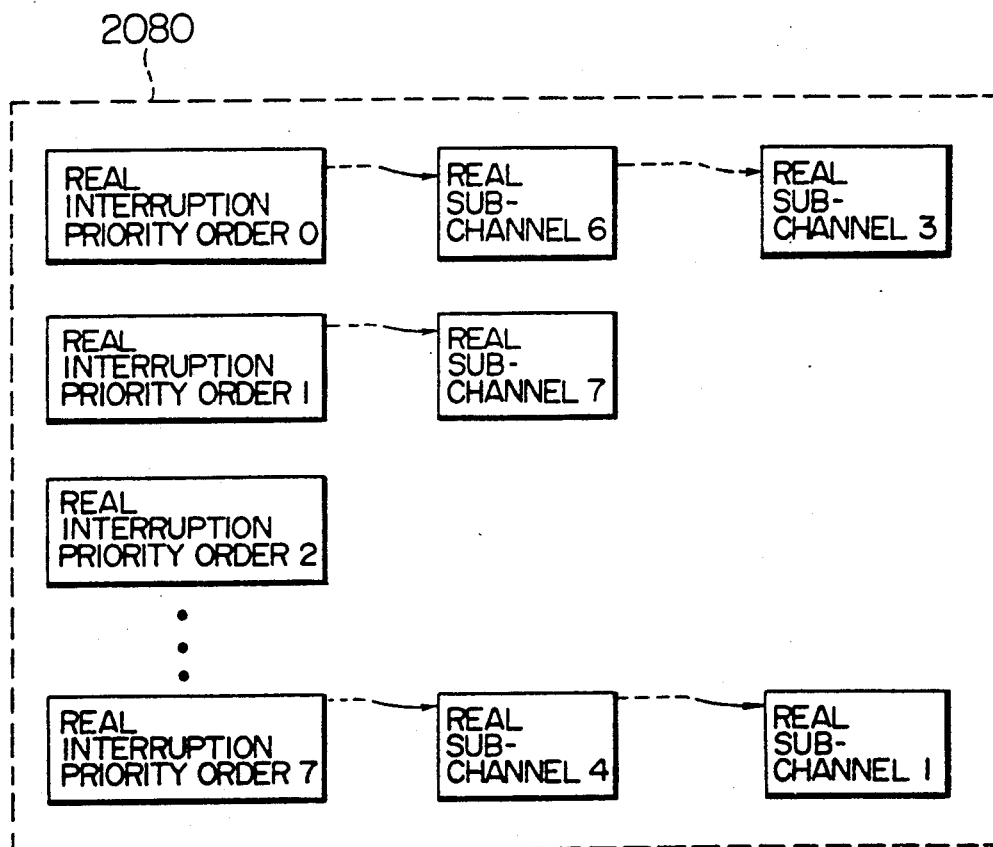
Figure 11:
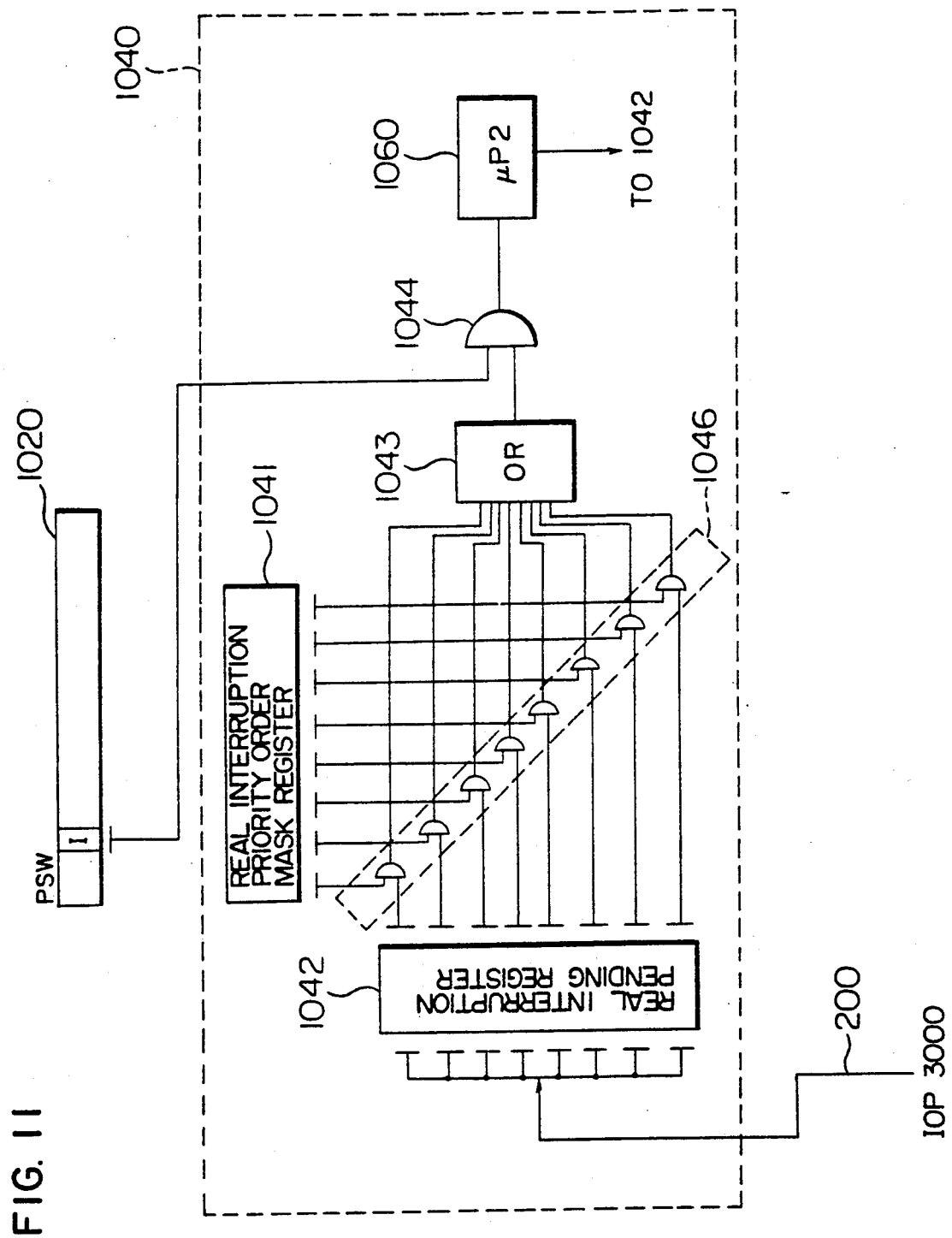

(1) The I/O interrupt request from the I/O device is detected by the IOP 3000' and the corresponding real sub-channel control block is queued in the corresponding real interruption priority order of the I/O interrupt request queue 2080 of the HSA 2001 (see FIG. 9), as is done in the prior art system.

(2) The IOP 3000' shown in FIG. 22 sets the corresponding bit of the real interrupt pending register 1042' to "1", as is done in the prior art system.

(3) The real interruption priority order mask register 1041' is set in the manner described before. The I/O interrupt circuit of FIG. 22 operates in the manner described above. Let us assume that the I/O interruption was started and the control was transferred to the I/O interrupt processing microprogram 1060'.

(4) If the interruption occurs with the real dedicated interruption priority order of the VM, the VM can accept the interruption for the virtual interruption priority order because of the settings in the real interruption priority order mask register 1041' and the real interruption priority order status register 1045. If the VM cannot accept the interruption, the I/O interruption cannot occur for that real interruption priority order by the actions of the I/O mask of the PSW 1020 and the registers 1041' and 1045, and the control is not transferred to 1060' but it is made pending by the hardware.

(5) The I/O interrupt microprogram 1060' carries out the following processings.

(i) Dequeues the real sub-channel of the I/O interrupt request queue 2080 (FIG. 9) on the real interruption priority order c requested the interruption.

(ii) Checks the VM mode flag bit V and the high speed VM mode flag H of the VMS control flag 1090' (FIG. 19), and if V="0" or H="0", reflects the interruption to the PSA of the VMCP. The PXR 1010 of the VMCP (FIG. 12) is used and control is transferred to the VMCP.

(iii) If V="1" and H="1", checks the I/O direct execution mode bit D of the VM. If D="0", it is not the I/O direct execution mode, and reflects the interruption to the PSA of the VMCP.

(iv) If D="1", the following processings are carried out.

(a) Whether the sub-channel is dedicated or not is determined by the status field (FIG. 16) in the real sub-channel control block, and if it is the shared sub-channel, reflects the interruption to the PSA of the VMCP.

(b) If the real interruption priority order c requesting the interruption is dedicated to the currently running VM, that is, if the corresponding bit of the real interruption priority order status register 1045 is "0" (see FIG. 21), reflects the interruption to the PSA of the currently VM to continue the current VM. The VM prefix register 1070 (FIG. 12) is used. The I/O interrupt information to the VM prefix is reflected by the virtual sub-channel number in the real sub-channel control block 2092' or the virtual interruption priority number.

(c) When the real interruption priority order c is dedicated to another VM, the interruption is reflected to the VMCP. Then, the interruption is reflected to the PSA of the VM by the VMCP.

(d) When the real interruption priority order c is shared, the interruption is reflected to the VMCP. Then, the interruption is reflected to the VM by the VMCP. The VM may not accept the interruption. In such a case, the I/O interruption is held pending by the VMCP.

As described above when the sub-channel is dedicated and has the dedicated real interruption priority order, the I/O direct execution (without the intervention of the VMCP) of the OS on the VM is supported for that sub-channel. For the I/O interruption, only the I/O interruption from the sub-channel dedicated to the current running VM is directly executed. For the I/O interruption from the sub-channel dedicated to another VM, the VMCP is to intervene because of necessity for scheduling of the VM's.

The direct I/O execution mode suppress flag of the status field 2093 in the real sub-channel control block of FIG. 16 is normally "0" so that the direct I/O execution mode of that sub-channel is supported. In the dedicated sub-channel, the I/O instruction is not issued from the OS on the VM other than the occupying VM but it may be issued from the VMCP. In this case, the direct I/O execution mode suppress flag in the status field 2093 is set to "1" until the I/O of the VMCP is completed so that the I/O direct execution mode for that sub-channel is suppressed.

Accordingly, this flag is set and reset under the control of the VMCP. In the above I/O execution system, the following considerations are pointed out.

(a) The R bit of the VMS control flags 1090' (FIG. 19) may be omitted. It is not necessary if the virtual sub-channel number and the virtual interruption priority order are always translated, or if those numbers are always equal when the direct I/O execution system of the present invention is applied in the VMS.

(b) The D flag may be replaced by the H flag, but the high speed VM mode flag H cannot control the direct execution of only the I/O instruction because it also controls the direct execution of the privileged instructions other than the I/O instruction.

(c) In the I/O interrupt processing, the I/O interruption from the real interruption priority order dedicated to the VM other than the currently running VM is reflected to the VMCP, as described above. Since the VM to which it is dedicated can accept the interruption, the interruption may be reflected to the PSA of that VM and then the control may be transferred to the VMCP in a form of VMCP call. The address of the PSA of the VM can be determined from the prefix management table of FIG.

13. In this case, it is necessary to determine the PSW of the VM and information therefor is required. It may be determined based on the VM number in various ways, although it is not illustrated.

(d) The start address of the sub-channel number translation table, the start address of the interruption priority order translation table, the real interruption priority order status register 1045 and the real interruption priority order dedication status register 1049 (FIG. 21) are all initialized by the operand of the start VM instruction (see FIG. 17). Alternatively, they may be initialized by a separate instruction of the VMCP.

As described hereinabove, in accordance with the present invention, the I/O instruction issued by the OS on the VM and the I/O instruction can be directly executed so that the I/O simulation overhead of the VMCP can be substantially reduced. This is an essential function to attain a virtual machine which has a performance very close to that of a real computer.

We claim:

1. In a computer system for concurrently running a plurality of operating systems under control of a control program, wherein the computer system includes (1) a plurality of I/O devices each of which is represented by at least one subchannel to an operating system, the one subchannel being either dedicated to one of the operating systems or shared by plural ones of the operating systems, (2) I/O instruction execution means for executing an I/O instruction which has been issued by a running operating system and which designates one subchannel assigned to one of the plurality of I/O devices in which an I/O operation is to be performed, and (3) execution control means connected to said I/O instruction execution means and said plurality of I/O devices and responsive to a request from said I/O instruction execution means for controlling execution of the I/O operation to the one I/O device, and I/O execution method comprising the steps of:

storing in a respective subchannel, which is dedicated to one of the operating systems, an identifier providing information usable for identifying said one operating system, wherein the storing of said identifier is carried out under control of the control program before the one operating system is to be run on the computer system;

accessing, in response to an issued I/O instruction, an identifier already stored in the subchannel designated by the issued I/O instruction and determining that the designated subchannel is dedicated to the running operating system, based on the accessed identifier; and producing a request to said execution control means to execute an I/O operation requested by the issued I/O instruction when the designated subchannel has been determined as being dedicated to the running operating system, wherein the identifier accessing step an the step of producing a request are carried out by means of said I/O instruction execution means, without intervention of the control program.

2. A method according to claim 1, further comprising steps executed by said I/O instruction execution means including:

setting an I/O direct execution mode flag to a selectable one of a first state and a second state under control of the control program when the control program starts running of the running operating system;

detecting a state of the I/O direct execution mode flag in response to the issue of the I/O instruction;

starting the accessing step when the state of the flag is detected as the first state by the detecting step; and interrupting out to said control program, without starting the accessing step, when the state of the flag is detected as the second state by the detecting step, so as to order the control program to simulate the issued I/O instruction.

3. A method according to claim 1, wherein the computer system further includes interruption control means connected to the plurality of I/O devices for processing an I/O interruption generated by one of the I/O devices, wherein real interruption priorities are assigned to subchannels each representing one of the I/O devices to an operating system and each real interruption priority being either dedicated to one of the operating systems or shared by plural ones of the operating systems, and wherein a plurality of virtual interruption priorities are available to each of the operating systems and each one of a plurality of virtual interruption priorities available to each operating system is assigned to one of the real interruption priorities, the method further comprising steps to be executed by said interruption control means, including:

determining whether an I/O interruption generated by one of the I/O devices satisfies a first condition that a real interruption priority assigned to one subchannel assigned to the one I/O device is dedicated to a currently running operating system, a second condition that an I/O mask within a program status word of the currently running operating system is in a state to allow acceptance of an interruption of an interruption priority, and a third condition that an interruption mask for one virtual interruption priority assigned to the real interruption priority among a plurality of virtual interruption priorities for the currently running operating system allows acceptance of an interruption; and indicating the generated I/O interruption to the currently running operating system when it is determined that the I/O interruption satisfies the first to third conditions.

4. A method according to claim 3, wherein the computer system further includes an I/O direct execution mode flag for designating an I/O operation mode, and further comprising steps to be executed by said interruption control means including:

detecting, in response to I/O interruption, a state of the I/O direct execution mode flag, so as to execute said determination and indication steps when said flag is in a first state; and interrupting out to the control program so as to inform the control program of occurrence of the I/O interruption when said flag is in a second state.

5. A method according to claim 3, further comprising the steps:

when the one operating system is running, storing a real interruption priority to be assigned to the subchannel in response to another instruction which is issued by the one operating system before the one running operating system issues the I/O instruction designating the subchannel and which requires modification of contents of the subchannel, the storing being done by means of the I/O instruction execution means; and indicating, by means of said execution control means and in response to subsequent generation of the I/O interruption by the one I/O device, a real interruption priority, stored in the subchannel representing the one I/O device and designated by the issued I/O instruction, to the interruption control means, so that the determining step is executed based upon the indicated real interruption priority.

6. A method according to claim 3, further comprising the steps of:

translating, by means of said I/O instruction execution means when the one operating system is running, a virtual subchannel number designated by the issued I/O instruction and indicative of a virtual subchannel to which the I/O operation relates to a real subchannel number indicative of one of the subchannels representing the plurality of the I/O devices to which the I/O operation relates, so as to indicate the one real subchannel number to the execution control means at the time of requesting the execution of the I/O operation; and translating, by means of said execution control means when it is determined that the generated I/O interruption satisfies the first to third conditions, the real subchannel number assigned to the real subchannel representing the one I/O device and designated by the issued I/O instruction, to the virtual subchannel number so as to indicate the virtual subchannel number to the running operation system.

7. A method according to claim 1, further comprising a step of:

translating, by means of said I/O instruction execution means when the one operating system is running, a virtual subchannel number designated by the issued I/O instruction and indicative of a virtual subchannel to which the requested I/O operation relates to a real subchannel number indicative of one of the real subchannels to which the I/O operation relates, so as to indicate the one real subchannel number to execution control means at the time of requesting of the execution of the I/O operation.

8. A method according to claim 1, further comprising the steps of:

storing in a respective subchannel which is dedicated to one of the operating systems, address translation information predetermined for the one operating system to translate addresses of a main memory of the one operating system into addresses of a main memory of the computer system, wherein the storing is carried out under control of the control program when the one operating system is to be run on the computer system;

accessing address translation information stored for the designated subchannel in response to the produced request;

translating addresses of channel commands, indicated by the issued I/O instruction into translated addresses of the main memory of the computer system, using the accessed address translation information;

fetching the channel commands from the main memory of the computer system, in response to the translated addresses obtained by the translating; and executing the I/O operations designated by the fetched channel commands to the one I/O device assigned the designated subchannel;

wherein the channel command address translating step to the executing step are carried out without intervention of the control program.

9. A method according to claim 8, further comprising the steps of:

translating data addresses included in the fetched channel commands using the accessed address translation information into addresses of the main memory of the computer system; and executing the I/O operations designated by the fetched channel commands based upon the addresses obtained by the translating of the data addresses;

wherein the translating of the data addresses is carried out without intervention of the control program.

10. A computer system for concurrently running a plurality of operating systems under control of a control program, comprising:

a plurality of I/O devices each of which is represented to one of the operating systems by one subchannel which is used either exclusively by one of the operating systems or in common by plural ones of the operating systems;

I/O instruction execution means for executing an I/O instruction which has been issued by a running operating system and which requires a subchannel representing one of the I/O devices for execution of an I/O operation required by the I/O instruction to the one I/O device; and execution control means for controlling execution of the I/O operation to the one I/O device;

wherein the I/O instruction execution means includes, means for determining, without intervention of the control program, whether the subchannel required by the issued I/O instruction is dedicated to the running operating system; and means for providing, without intervention of the control program, said execution control means with a request to execute the required I/O operation when the required subchannel has been determined as being dedicated to the running operation system; and wherein said execution control means includes means, responsive to the request, for translating a memory address required by the issued I/O instruction, for a main memory of the operating system which has issued the I/O instruction to a real main memory address of the main memory of the computer system, without intervention of the control program.

11. A computer system according to claim 10, wherein the computer system further includes: interruption control means connected to the plurality of I/O devices for processing an I/O interruption generated by one of the I/O devices, wherein respective real interruption priorities are assigned to respective subchannels representing said plurality of I/O devices to an operating system and each real interruption priority is either dedicated to one of the operating systems or shared by plural ones of the operating systems, wherein a plurality of virtual priorities are available to each of the operating systems and each of a plurality of virtual interruption priorities available to each operating system is assigned to one of the real priorities;

wherein said interruption control means includes means for determining whether an I/O interruption generated by one of the I/O devices can be accepted, depending upon whether or not the interruption satisfies a first condition that a real interruption priority assigned to a subchannel representing the one I/O device is dedicated to a currently running operating system, a second condition that an I/O mask of a program status word of the currently running operating system is in a state to allow acceptance of an I/O interruption of some interruption priority, and a third condition that a mask for a virtual interruption priority assigned to the real interruption priority among a plurality of virtual interruption priorities available to the currently running operating system is in a state to allow acceptance of an interruption; and wherein said interruption control means includes means for indicating the generated I/O interruption to the running operating system when it is determined that the generated I/O interruption satisfies the first through third conditions.

12. An I/O execution method for a plurality of operating systems running concurrently under control of a control program on a computer system, which includes a plurality of subchannels each representing one of a plurality of I/O devices to one of the operating systems, when processing related to the one I/O device is to be executed, comprising the steps of:

assigning the plurality of subchannels to the plurality of operating systems so that at least one of the subchannels is dedicated to one of the operating systems; and in response to an I/O instruction which has been issued by a running operating system and which requires a subchannel assigned to one of the I/O devices, executing the issued I/O instruction under a condition that the required subchannel is dedicated to the running operating system and not requesting the control program to simulate the issued I/O instruction.

13. A method according to claim 12, wherein the assigning includes the steps of storing an identifier for use in identifying the one operating system to which is dedicated the one subchannel; and wherein the executing includes the steps of determining, before execution of the issued I/O instruction, whether the required subchannel is used exclusively by the running operation system which issued the I/O instruction, base upon information stored in the subchannel required by the issued I/O instruction and information to the running operating system which issued the I/O instruction.

14. A method according to claim 13, wherein the determining further includes:

translating a virtual subchannel number designated by the issued I/O instruction into a real subchannel number indicative of one of the plurality of subchannels, required by the issued I/O instruction.

15. A method according to claim 13, further comprising storing address transformation information for the one subchannel used exclusively by the one operating system, at a time of assigning of the one subchannel to the one operating system, the address transformation information being used for translating an address relating to a main memory of the one operating system into an address related to an address of the main memory of the computer system.

16. A method according to claim 15, wherein the main memory of the computer system includes a plurality of regions each for use as a main memory of one of the plurality of operating systems; and wherein the address transformation information for the one operating system designates a starting address of one of the plurality of regions to be used as a main memory of the one operating system.

17. A method according to claim 12, wherein the I/O instruction executing includes:

registering a request for processing required by the issued I/O instruction into an I/O queue provided in a main memory of the computer system; and storing information used in the required processing into the subchannel required by the issued I/O instruction.

18. A method according to claim 17, wherein the registering includes registering a subchannel number of the required subchannel into the I/O queue.

19. A method according to claim 17, wherein the information stored in the required subchannel includes an address of a main storage of the running operating system for channel command words defining the required processing.

20. A method according to claim 12, further comprising the step of executing an I/O operation required by the issued I/O instruction to one of the plurality of I/O devices represented by the subchannel required by the issued I/O instruction, in response to execution of the issued I/O instruction;

wherein the main memory of the computer system includes a plurality of regions each for use as a main memory of one of the plurality of operating systems; and wherein the I/O operation executing step includes the step of translating a main memory address of a main memory of the running operating system which has issued the I/O instruction, as required by the issued I/O instruction for execution of the I/O operation, into a main memory address of the main memory of the computer system, based upon a starting address of one of the plurality regions assigned to the running operating system which has issued the I/O instruction.

21. An I/O execution method for a plurality of operating systems running concurrently under control of a control program on a computer system, which includes a plurality of subchannels each representing one of a plurality of I/O devices operating systems, comprising the steps of:

storing a direct execution mode flat in each of plural ones of subchannels used by one of the plurality of operating systems, said direct execution mode flag having either a first or second value;

in response to an I/O instruction which has been issued by the one operating system when the one operating system is running and which requires one of the plurality of subchannels, executing the I/O instruction when the direct execution mode flag for the required subchannel has a first value and not requesting the control program to simulate the issued I/O instruction; and in response to the I/O instruction, requesting the control program to simulate the issued I/O instruction when the direct execution mode flag for the required subchannel has a second value.

22. An I/O execution method for a plurality of operating systems running concurrently under control of a control program on a computer system, which includes a plurality of subchannels, each subchannel representing one of a plurality of I/O devices to one of the operating systems, wherein each subchannel has been assigned one of a plurality of real interruption priorities and the computer system uses a subchannel representing one of the plurality of I/O devices and a real interruption priority assigned to the subchannel when processing related to the one I/O device is to be executed, comprising the steps of:

assigning the plurality of real interruption priorities to the plurality of subchannels in such a manner that at least one of the real interruption priorities is exclusively used by one of the operating system; and in response to an I/O interruption generated by one of the plurality of I/O devices, processing the generated I/O interruption based upon a parameter designated by a currently running operating system with respect to interruption handling, under a condition that one real interruption priority assigned to one subchannel representing the one I/O device is used exclusively by the currently running operating system, and not requesting the control program to simulate the generated interruption.

23. A method according to claim 22, wherein the processing includes the steps of:

determining, under that condition, whether the generated interruption is acceptable by the currently running operating system, from said parameter; and informing the currently running operating system of the generated interruption when the generated interruption is acceptable by the currently running operating system.

24. A method according to claim 23, further comprising the step of assigning at least one of the plurality of real interruption priorities to a plurality of virtual interruption priorities available to the currently running operating system; and wherein said parameter includes an I/O mask within a program status word for the currently running operating system and a mask signal designated by the currently running operating system for a virtual interruption priority to which is assigned the one real interruption priority.

25. A method according to claim 22, wherein the processing includes the steps of:

accepting the generated I/O interruption, when the generated I/O interruption satisfies a predetermined condition for acceptance; and in response to acceptance of the generated I/O interruption, detecting whether the generated I/O interruption is an interruption directed to the currently running operating system, depending upon whether the one real interruption priority assigned to the one subchannel representing the one I/O device is used exclusively by the currently running operating system and without requesting intervention of the control program for the detecting.

26. A method according to claim 25, wherein the predetermined condition for acceptance is set (a) to accept the generated interruption at least when the subchannel representing the one I/O device has been assigned a real interruption priority exclusively used by the currently running operating system and the parameter allows acceptance by the currently running operating system of an I/O interruption of a virtual interruption priority assigned with the real interruption priority, and (b) to not accept the generated interruption at least when the subchannel representing the one I/O device has assigned thereto a real interruption priority exclusively used by the currently running operating system and the parameter does not allow acceptance by the currently running operating system of an I/O interruption of a virtual interruption priority assigned with the real interruption priority; and wherein the processing further includes the step of handling the generated I/O interruption as an I/O interruption acceptable by the currently running operating system, without further checking the acceptability of the generated I/O interruption by the currently running operating system, when the generated I/O interruption has been detected as one directed to the currently running operating system after being accepted.

27. A method according to claim 22, further comprising the step of registering the generated I/O interruption to one interruption queue provided for a real interruption priority assigned to the subchannel representing the one I/O device, among a plurality of interruption queues respectively provided for the plurality of real interruption priorities in a main memory of the computer system; and wherein the processing is executed for the generated interruption after it is registered into one of the queues.

28. An I/O execution method for a plurality of operating systems running concurrently under control of a control program on a computer system which includes a plurality of subchannels, each subchannel representing one of a plurality of I/O devices to one of said operating systems, wherein each subchannel has been assigned one of a plurality of real interruption priorities and the computer system uses a subchannel representing one of the plurality of I/O devices and a real interruption priority assigned to the subchannel when processing related to the one I/O device is to be executed, comprising the steps of:

assigning the plurality of subchannels to the operating systems in such a manner that at least one of the plurality of subchannels is used exclusively by one of the operating systems;

assigning the plurality of real interruption priorities to the plurality of subchannels in such a manner that at least one of the real interruption priorities is used exclusively by one of the operating systems;

in response to an I/O instruction which has been issued by a running operating system and which requires a subchannel representing one of the I/O devices, executing the I/O instruction under a condition that the required subchannel is used exclusively by the running operating system and not requesting intervention by the control program for the execution; and in response to an I/O interruption generated by one of the plurality of I/O devices, processing the generated I/O interruption based upon a parameter designated by the currently running operating system with respect to interruption handling, under a condition that one real interruption priority assigned to one subchannel representing a one I/O device is used exclusively by the currently running operating system, and not requesting intervention by the control program for the processing.

29. A computer system for concurrently running a plurality of operating systems under control of a control program, comprising:
a plurality of I/O devices each of which is represented to an operating system by a subchannel, whereby a plurality of subchannels represent said plurality of I/O devices to the operating systems;
an instruction execution circuit for executing an I/O instruction which requires a subchannel representing one of the I/O devices;
wherein at least one of the plurality of subchannels is used exclusively by one of the operating systems; and
wherein said instruction execution circuit executes an I/O instruction which has been issued by a running operating system and which requires one of the plurality of subchannels in response to the issuing of the I/O instruction, under a condition that the one subchannel required by the issued I/O instruction is used exclusively by the running operating system, and does not request the control program to simulate the issued I/O instruction.

30. A computer system according to claim 29, wherein each subchannel used exclusively by one of the operating systems includes information for use in determining whether the subchannel is used exclusively by a running operating system; and
wherein said instruction execution circuit includes means for determining whether the one subchannel required by the issued I/O instruction is used exclusively by the running operating system which has issued the I/O instruction, depending upon information already stored in the one required subchannel, and for executing the issued I/O instruction when the required one subchannel is dedicated to the running operating system which has issued the I/O instruction.

31. A computer system according to claim 29, wherein said instruction execution circuit includes means for registering a request to use the one subchannel, required by the issued I/O instruction, into an I/O request queue, during the executing of the issued I/O instruction, and for registering control information into the one subchannel required by the issued I/O instruction, during the execution thereof, wherein the I/O request queue is provided in a main memory of the computer system and the control information is required for execution of processing required by the issued I/O instruction.

32. A computer system according to claim 29, further comprising:
means connected to said instruction execution circuit and said plurality of I/O devices and responsive to the execution of the issued I/O instruction for executing processing required by the issued I/O instruction by using the one subchannel required thereby.

33. A computer system according to claim 32, wherein said processing executing means includes means for translating, without intervention of the control program, a memory address, required for execution of the required processing and related to a main memory of the running operating system, into a corresponding memory address with respect to a main memory of the computer system.

34. A computer system according to claim 33, wherein said required memory address is for a channel command word designating the required processing.

35. A computer system according to claim 34, wherein said processing executing means further includes:
means for fetching the requested channel command word from the main memory of the computer system, in response to the corresponding main memory address and without intervention of the control program, and for executing the fetched channel command word;
wherein execution of the fetched channel command word includes translation of a main memory address included therein for data to be processed into a corresponding main memory address for data with respect to the main memory of the computer system, without intervention of the control program, the main memory address for data being an address for to the main memory of the running operating system.

36. A computer system according to claim 32, wherein said processing executing means includes means for executing channel command words prepared by the running operating system for the issued I/O instruction.

37. A computer system according to claim 36, wherein a main memory of the computer system includes a plurality of regions each being used as a main memory region of a corresponding one of the operating systems; and
said channel command executing means includes means for translating, without intervention of the control program, memory addresses related to the channel commands, with respect to a main memory of the running operating system, into the corresponding memory addresses belonging to a main memory region for the running operating system provided in the main memory of the computer system.

38. A computer system according to claim 29, wherein said instruction executing circuit includes means for requesting the control program to simulate the issued I/O instruction when the one subchannel required thereby is not used exclusively by the running operating system.

39. A computer system for concurrently running a plurality of operating systems under control of a control program, comprising:
a plurality of I/O devices each of which is represented to an operating system by a subchannel, whereby a plurality of subchannels represent said plurality of I/O devices to the operating systems; and
an instruction execution circuit for executing an I/O instruction which requires a subchannel representing one of the I/O devices;
wherein said instruction execution circuit executes an I/O instruction which has been issued by a running operating system and which requires one of the plurality of subchannels after detecting that the issued I/O instruction satisfies a predetermined condition so as to perform the execution of said issued I/O instruction without requesting the control program to simulate the issued I/O instruction.

40. A computer system according to claim 39, wherein at least one of the plurality of subchannels is used exclusively by one of the operating systems; and said predetermined condition is that the one subchannel required by the issued I/O instruction is dedicated to the running operating system.

41. A computer system for concurrently running a plurality of operating systems under control of a control program, comprising:
- a plurality of I/O devices each of which is represented to an operating system by a subchannel, whereby a plurality of subchannels represent the I/O devices to the operating systems, wherein each subchannel has been assigned thereto one of a plurality of real interruption priorities; and
- an interrupt processing circuit, connected to said plurality of I/O devices and responsive to an I/O interruption generated by one of said plurality of I/O devices, for processing the generated I/O interruption;
- wherein at least one of the plurality of real interruption priorities is used exclusively by one of the operating systems; and
- wherein the interrupt processing circuit processes the generated I/O interruption by using a parameter designated by a currently running operating system with respect to interruption handling, under a condition that one real interruption priority assigned to a subchannel representing the one I/O device is used exclusively by the currently running operating system, and does not request the control program to simulate the generated I/O interruption.

42. A computer system according to claim 41, wherein the interrupt processing circuit determines whether the generated I/O interruption is acceptable by the currently running operating system, based upon said parameter, and informs the currently running operating system of the generated I/O interruption, when the generated I/O interruption is acceptable by the currently running operating system.

43. A computer system according to claim 41, wherein the interrupt processing circuit holds the generated I/O interruption in a pending state, when the generated I/O interruption is not acceptable by the currently running operating system.

44. A computer system according to claim 41, wherein at least one of the plurality of real interruption priorities is assigned to one of a plurality of virtual interruption priorities available to the currently running operating system; and
- wherein said parameter includes an I/O mask within a program status word for the currently running operating system and a mask signal designated by the currently running operating system for a virtual interruption priority to which is assigned the one real interruption priority.

45. A computer system for concurrently running a plurality of operating systems under control of a control program, comprising:
- a plurality of I/O device each of which is represented by one of a plurality of subchannels to one of the operating systems, wherein each subchannel is assigned with one of a plurality of real interruption priorities; and
- interrupt means connected to said plurality of I/O devices and responsive to an I/O interruption generated by one of said plurality of I/O devices, for processing the generated I/O interruption;
- wherein at least one of the plurality of real interruption priorities is used exclusively by one of the operating systems; and
- wherein the interrupt means (1) detects whether a condition is satisfied (i) that one real interruption priority assigned to one subchannel representing the one I/O device is used exclusively by a currently running operating system, (ii) that an I/O mask within a program status word of the currently running operating system is in a state to accept an I/O interruption, and (iii) that a mask signal for a virtual interruption priority corresponding to the one real interruption priority among a plurality of virtual interruption priorities available to the currently running operating system is in a state to accept an I/O interruption of the corresponding virtual interruption priority, and (2) informs the currently running operating system of the generated I/O interruption, when the condition is satisfied, and does not request the control program to simulate the generated I/O interruption.

46. A computer system according to claim 45, wherein said interrupt means includes:
- an interruption pending register having locations each for holding an interruption of a corresponding real interruption priority which interruption has been generated but not accepted;
- a mask register for holding a plurality of mask signals respectively corresponding to the plurality of real interruption priorities, one of the mask signals corresponding to a real interruption priority exclusively used by a currently running operating system being set to a same value as a mask signal determined by the currently running operating system for a virtual interruption priority corresponding to the exclusively used real interruption priority, among a plurality of virtual interruption priorities available to the currently running operating system;
- a real priority status register for holding a plurality of dedication status signals respectively corresponding to the plurality of real interruption priorities, each dedication status signal indicating whether a corresponding real interruption priority is dedicated to the currently running operating system;
- a PSW register for holding a program status word which includes an I/O mask;
- means connected to said plurality of I/O devices and responsive to the generated I/O interruption for storing the generated I/O interruption into one of the locations within the interruption pending register, which one location corresponds to a real interruption priority assigned to the subchannel representing the one I/O device;
- means connected to said interruption pending register, said mask register, said real priority status register and said PWS register for determining whether the generated interruption is acceptable; and
- means connected to said real priority status register and said determining means for detecting whether the real interruption priority for the generated interruption is used exclusively by the currently running operating system, based upon a dedication status signal held by said real priority status register, when the generated interruption is acceptable, and for informing the currently running operating system of the generated interrupt without intervening to the control program, when said detecting means detects dedication of the real interrupt priority to the currently running operating system.

47. A computer system for concurrently running a plurality of operating systems under control of a control program, comprising:
- a plurality of I/O devices each of which is represented to an operating system by at least one of a plurality of subchannels available in the computer system, each subchannel having been assigned thereto one of a plurality of real interruption priorities;
- interruption means connected to said plurality of I/O devices and responsive to an I/O interruption generated by one of said plurality of I/O devices for processing said I/O interruption;
- wherein at least one of the plurality of real interruption priorities is exclusively used by one of the operating systems;
- wherein said processing means includes detect means for detecting whether the generated I/O interruption is an interruption directed to and acceptable by a currently running operating system and for informing the currently running operating system of the generated I/O interruption when the generated I/O interruption is detected as an interruption directed to and acceptable by the currently running operating system; and
- wherein the detecting is performed under a condition that one real interruption priority assigned to one subchannel representing the one I/O device is exclusively used by the currently running operating system, and is performed without requesting intervention by the control program.

48. A computer system according to claim 47, wherein the detecting is based upon at least a mask signal determined by the currently running operating system for one virtual interruption priority which has been found to correspond to the one real interruption priority, among a plurality of virtual interruption priorities available to the currently running operating system.

49. A computer system according to claim 48, wherein the detecting is further based upon an I/O mask within a program status word of the currently running operating system.

50. A computer system for concurrently running a plurality of operating systems under control of a control program, comprising:
- a plurality of I/O devices each of which is represented to an operating system by one of a plurality of subchannels available in the computer system, each subchannel having been assigned one of a plurality of real interruption priorities;
- interruption means connected to said plurality of I/O devices and responsive to an I/O interruption generated by one of said plurality of I/O devices for processing said interruption;
- wherein at least one of the plurality of real interruption priorities is exclusively used by one of the operating systems; and
- wherein said processing means includes means for detecting, without intervention by the control program, whether the generated interruption is an interruption acceptable by a currently running operating system, when one subchannel representing the one I/O device is exclusively used by the currently running operating system, and for informing the currently running operating system of the generated I/O interruption when the generated I/O interruption is detected as an interruption acceptable by the currently running operation system; and
- wherein said detecting means includes first means for performing the detecting, at least based upon one mask signal prepared for one real interruption priority assigned to the one subchannel and dedicated to the currently running operating system;
- wherein the value of the one mask signal is determined, depending upon a mask signal determined by the currently running operating system for at least one virtual interruption priority which is found to be correspond to the one real interruption priority, among a plurality of virtual interruption priorities available to the currently running operating system.

51. A computer system according to claim 50, wherein said means included in said first detecting means includes second means for performing the detection further based upon an I/O mask of a program status word of the currently running operating system.

52. A computer system according to claim 50, wherein said detecting means includes:
- an interruption accept circuit including a plurality of mask signals respectively provided for the real interruption priorities; and
- means for determining whether the generated I/O interruption is an interruption acceptable by the currently running operating system, when the generated I/O interruption has been accepted by the interruption accept circuit;
- wherein one of the plurality of mask signals, provided for the one real interruption priority assigned to the one subchannel, has a value to allow acceptance of the generated interruption, when the mask signal determined by the currently running operating system for the at least one virtual interruption priority has a value to allow acceptance of an interruption.

53. An interruption processing circuit for a computer system for concurrently running a plurality of operating systems under control of a control program, wherein the computer system includes a plurality of I/O devices each of which is represented by one of a plurality of subchannels to an operating system, wherein each subchannel has been assigned one of a plurality of real interruption priorities, and wherein at least one of the plurality of real interruption priorities is exclusively used by one of the operating systems, comprising:
- an interruption pending register having locations each for holding an I/O interruption of a corresponding real interruption priority, which I/O interruption has been generated but not accepted;
- a mask register for holding a plurality of mask signals respectively corresponding to the plurality of real interruption priorities, one of the mask signals corresponding to a real interruption priority exclusively used by a currently running operating system being set to a value dependent upon a mask signal determined by the currently running operating system for a virtual interruption priority which corresponds to the exclusively used real interruption priority, among a plurality of virtual interruption priorities available to the currently running operating system; and
- means connected to said interruption pending register and said mask register for detecting whether the generated I/O interruption is acceptable.

54. An interruption processing circuit according to claim 53, wherein said detecting means further includes means for determining whether the generated interruption is acceptable by the currently running operating system, when the generated interruption has been detected as being acceptable by said detecting means.

55. A computer system for concurrently running a plurality of operating systems under control of a control program, comprising:

- a plurality of I/O devices each of which is represented to one of the operating systems by one subchannel which is used either exclusively by one of the operating systems or in common by plural ones of the operating systems;
- an I/O instruction execution circuit executing an I/O instruction which has been issued by a running operating system and which requires a subchannel representing one of the I/O devices for execution of an I/O operation required by the I/O instruction to the one I/O device, said circuit including means for determining, without intervention of the control program, whether the subchannel required by the issued I/O instruction is dedicated to the running operating system, and for registering, without intervention of the control program, a request to execute the required I/O operation with an I/O queue provided in a main memory of the computer system when the required subchannel has been determined as being dedicated to the running operating system; and
- an I/O processor connected to the main memory of the computer system, fetching the request form the I/O queue asynchronously to the registering of the request into the I/O queue, said I/O processor further controlling execution of the required I/O operation to the one I/O device, in response to the fetched request, said I/O processor having means for translating, without intervention of the control program, a memory address required by the issued I/O instruction, for a main memory of the operating system which has issued the I/O instruction into an address of the main memory of the computer system.

* * * * *